(12) United States Patent
Takamichi

(10) Patent No.: US 6,496,513 B1
(45) Date of Patent: Dec. 17, 2002

(54) TRAFFIC PRIORITY CONTROL SYSTEM FOR A CONCENTRATION-TYPE ATM SWITCH

(75) Inventor: Toru Takamichi, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/184,568

(22) Filed: Nov. 2, 1998

(30) Foreign Application Priority Data

Nov. 6, 1997 (JP) ............................................. 9-304594

(51) Int. Cl.[7] .................................................. H04J 3/17
(52) U.S. Cl. ...................... 370/434; 370/235; 370/395.1
(58) Field of Search ................................ 370/232, 389, 370/395.1, 398, 399, 419, 420, 473, 434

(56) References Cited

U.S. PATENT DOCUMENTS

| | | | |
|---|---|---|---|
| 5,280,483 A | * | 1/1994 | Kamoi et al. ............... 370/94.1 |
| 5,555,265 A | * | 9/1996 | Kakuma et al. .............. 370/60 |
| 5,940,375 A | * | 8/1999 | Soumiya et al. ............ 370/249 |
| 5,949,757 A | * | 9/1999 | Katoh et al. ................ 370/232 |

FOREIGN PATENT DOCUMENTS

| | | |
|---|---|---|
| JP | 4220834 | 8/1992 |
| JP | 7-66827 | 3/1995 |

* cited by examiner

*Primary Examiner*—Hassan Kizou
*Assistant Examiner*—Tim Spafford
(74) *Attorney, Agent, or Firm*—Dickstein, Shapiro, Morin & Oshinsky, L.L.P.

(57) ABSTRACT

An ATM concentrator connects (m×n) input highways to n output highways and performs a full priority control. The ATM concentrator has output cell buffers for respective quality classes. Cells are read from the output buffers of the quality classes and the number of valid cells thereof is checked. A quality class c is determined with respect to which an accumulated value of the numbers of valid cells calculated successively from quality classes of higher priority is maximum within the total number of the output highways. The ATM concentrator outputs only cells of the highest priority class if the quality class c is the highest priority class. When the quality class c is not the highest priority class, the ATM concentrator writes valid cells of next priority class through the quality class c over cells that are not valid cells in the highest priority class.

8 Claims, 17 Drawing Sheets

TRAFFIC PRIORITY CONTROL SYSTEM FOR A CONCENTRATION-TYPE ATM SWITCH

BACKGROUND OF THE INVENTION

1. Field of the Invention

The present invention relates to a traffic priority control system for a concentration-type ATM (Asynchronous Transfer Mode) switch which is used in an ATM exchange, an ATM cross-connect apparatus, or the like, and more particularly to an ATM concentrator for achieving traffic priority control while preventing a reduction in the throughput of transmitted cells of low priority class with a plurality of output cell buffers for priority classes.

2. Description of the Prior Art

For ATM communications, an information signal such as an audio, video, or data signal is digitized and stored in the payload of an ATM cell that is 53 bytes long, and an ATM traffic composed of the ATM cells is transmitted.

Audio, video, and data signals have different information rates (i.e., transmission bands) and different allowable transmission delay times. Therefore, users of these signals pose different requirements for the qualities of services (QoS) of ATM networks, such as transmission band assurances and transmission delay assurances, with respect to audio, video, and data traffic. For example, users want to reduce any transmission delay for audio and video traffic because if the transmission delay were too large, audio and video signals reproduced from ATM cells at a receiver would be unnatural to the users. On the other hand, low-rate data traffic keep their qualities from being lowered even when their transmission delay is somewhat large.

There is known a priority control system for controlling the transmission of information signals depending on a number of quality classes established with respect to different requirements for transmission delays and transmission bands of the information signals. According to the priority control system there are established, more specifically, quality classes for traffic comprising ATM cells of information signals, and one of the quality classes is assigned to an ATM cell depending on connection numbers such as VPI (Virtual Path Identifier) and VCI (Virtual Connection Identifier) and a CLP (Cell Loss Priority) bit that are contained in the header of the ATM cell. In a buffer of an ATM exchange or an ATM cross-connect, the quality class of the ATM cell for a connection is determined depending on the VPI, the VCI, and the CLP bit in the header of the arrived ATM cell, and the ATM cell is controlled for transmission depending on the determined quality class.

One example of such a priority control system will be described below with reference to FIG. 1. FIG. 1 shows an ATM cell buffer system having a single input highway and a single output highway. There are established two quality classes with respect to transmission delays, i.e., a high priority class (class 1) and a low priority class (class 2) for ATM cells. The ATM cell buffer system has a cell buffer 33 for storing ATM cells of the high priority class and a cell buffer 34 for storing ATM cells of the low priority class. The cell buffers 33, 34 are connected to the input highway through respective connection filters 31-1, 31-2. The connection filters 31-1, 31-2 refer to the VPI, the VCI, and the CLP bit of each ATM cell that has arrived from the input highway to determine the quality class of each ATM cell, and transfers valid cells of determined quality classes to the respective cell buffers 33, 34. For example, if an ATM cell that has arrived at the connection filter 31-1 is of the high priority, then the connection filter 31-1 stores the ATM cell in the cell buffer 33, and if an ATM cell of the low priority has arrived, then the connection filter 31-2 stores the ATM cell in the cell buffer 34. The cell buffers 33, 34 have respective output terminals connected to a readout controller 32 which reads ATM cells from the cell buffers 33, 34.

According to a process of determining a sequence to read ATM cells in the readout controller 32, as disclosed in Japanese laid-open patent publication No. 4-220834 (JP, A, 04220834) (column 7, lines 9 to 14), for example, the readout controller 32 attempts to read ATM cells from the cell buffer 33 for the high priority class, and if the number of ATM cells stored in the cell buffer 33 is zero, then the readout controller 32 attempts to read ATM cells from the cell buffer 34 for the low priority class. Such a process is referred to as full priority control. The full priority control is advantageous in that it allows the readout controller 32 to carry out a simple control process and is applicable to high-speed circuits.

An ATM concentrator will be described below. An ATM concentrator is an ATM switch for connecting a plurality of input highways to a fewer number of output highways than the input highways. An (m×n–n) ATM concentrator connects (m×n) input highways to n output highways. For example, as disclosed in Japanese laid-open patent publication No. 7-66827 (JP, A, 07066827) (see FIG. 1 thereof), if an ATM exchange or an ATM cross-connect which has (m×n) input highways and (m×n) output highways is to be constructed with m basic modules having n input highways and n output highways and a single connection module, an (m×n–n) ATM concentrator is used for connecting (m×n) input highways to n output highways in the connection module.

FIG. 2 shows a conventional (m×n–n) ATM concentrator. An (m–1) selector serves to select one of m highways, and n pieces of (m–1) selectors 11-1 to 11-n are connected to (n×m) input highways. A counter 12 is connected to control the (m–1) selectors 11-1 to 11-n to select one of the input highways. Output signals from the (m–1) selectors 11-1 to 11-n are supplied through respective connection filters 36-1 to 36-n to a routing decision circuit 13. The routing decision circuit 13 has output terminals connected to a routing network 14 of an (n×n) Banyan switch. The routing network 14 has n output terminals connected through respective output cell buffers 35-1 to 35-n, each comprising an FIFO (First-In First-Out) memory, to n output highways.

Input signals from the (n×m) input highways are multiplexed into n signals, whose speed is m times the speed of the input signals, by the (m–1) selectors 11-1 to 11-n. Specifically, if the speed of an input signal from an input highway is represented by V, then the speed of a signal outputted from an (m–1) selector is represented by mV. Based on a signal generated by the counter 12, the (m–1) selectors 11-1 to 11-n are operated in synchronism each other for synchronized multiplex timing. The n multiplexed signals are delivered to the connection filters 36-1 to 36-n, respectively, which refer to the VPI, the VCI, or the CLP bit in the header of each ATM cell to decide whether the ATM cell is a valid cell of a passing connection to pass through the ATM concentrator or not. If the ATM cell is a valid cell of a passing connection, then the connection filters 36-1 to 36-n send the valid cell to the routing decision circuit 13. If the ATM cell is not of a passing connection or it is an invalid cell of a passing connection, then the connection filters 36-1 to 36-n write the ATM cell over an idle cell or an invalid cell.

The routing decision circuit 13 and the routing network 14 serve to hold sequences of arrival of valid cells from the same input highways and store valid cells uniformly in the output cell buffers 35-1 to 35-n for thereby preventing valid cells from concentrating on and hence overflowing some of the output cell buffers 35-1 to 35-n. Based on the known function of the Banyan switch for sorting a monotonous signal string into a continuous signal string without blocking, the routing decision circuit 13 and the routing network 14 shift and output valid cells, one by one, successively from highways of smaller numbers, and shift effective cells arriving in a next cell slot from a highway represented by the sum of 1 and the maximum highway number of the highway which has outputted valid cells in a preceding cell slot. When the highway number reaches its maximum value n, the routing decision circuit 13 and the routing network 14 control the highway number to go back to the first highway. Idle cells and invalid cells are outputted to a highway which is free of valid cells. A j-th highway will hereinafter be represented by "HWj".

If four valid cells are simultaneously inputted to odd-numbered highways HW1, HW3, HW5, HW7 of the routing decision circuit 13 when n=8, then the routing network 14 outputs valid cells at the highways HW1, HW2, HW3, HW4. If seven valid cells are simultaneously inputted to the routing decision circuit 13 in a next cell slot, then the routing network 14 outputs valid cells at the highways HW5, HW6, HW7, HW8, HW1, HW2, HW3. The routing network 14 transmits ATM cells at a speed mV which is m times the input signal speed V to the output cell buffers 35-1 to 35-n, each of which stores m ATM cells in one cell slot. The output cell buffers 35-1 to 35-n store input cells even when they are idle cells or invalid cells other than valid cells. ATM cells are read from the cell output positions of the output cell buffers 35-1 to 35-n in each cell slot. Even if cells stored in the output cell buffers 35-1 to 35-n are idle cells or invalid cells, they are read from the output cell buffers 35-1 to 35-n.

FIG. 3 shows a conventional ATM concentrator for carrying out the full priority control with quality classes established. The ATM concentrator shown in FIG. 3 is similar to the ATM concentrator shown in FIG. 2 except that a high priority class (class 1) and a low priority class (class 2) are established with respect to transmission delays for full priority control. A cell stream from (n×m) input highways is supplied simultaneously to a sorting unit 1 for the high priority class and a sorting unit 2 for the low priority class. Each of the sorting units 1, 2 serves to concentrate the (n×m) input highways to n output highways. The sorting unit 1 for the high priority class has n output terminals connected respectively to output cell buffers 3-1 to 3-n for the high priority class. The numbers of valid cells stored in the output cell buffers 3-1 to 3-n are held by a valid cell number table 4. Similarly, the sorting unit 2 for the low priority class has n output terminals connected respectively to output cell buffers 6-1 to 6-n for the low priority class. The numbers of valid cells stored in the output cell buffers 6-1 to 6-n are held by a valid cell number table 7. A selector 39 serves to select n out of 2n highways from the output cell buffers 3-1 to 3-n, 6-1 to 6-n. A readout controller 38 refers to the valid cell number tables 4, 7 to control the reading of cells in the selector 39.

An example of each of the sorting units 1, 2 is shown in FIG. 4. The sorting unit shown in FIG. 4 is similar to a block 37, indicated by the dotted lines, of the ATM concentrator shown in FIG. 2 except that the connection filters 36-1 to 36-n shown in FIG. 2 are replaced with connection quality class filters 15-1 to 15-n which function as both connection filters and quality filters. The connection quality class filters 15-1 to 15-n refer to the VPI, the VCI, or the CLP bit in the header of each ATM cell to decide whether the ATM cell is an valid cell of a passing connection to pass through the sorting unit or not. If the ATM cell is an valid cell of a passing connection, then the connection quality class filters 15-1 to 15-n determines the quality class of the valid cell, i.e., decides whether the quality class is the class 1 or the class 2, based on the VPI, the VCI, or the CLP bit. If the ATM cell is an valid cell of the quality class to pass through the sorting unit 1 or 2, then the connection quality class filters 15-1 to 15-n send the valid cell to the routing decision circuit 13. If the ATM cell is not of a passing connection or it is an invalid cell of a passing connection, or if it is a valid cell of a passing connection but is not of the quality class to pass through the sorting unit, then the connection quality class filters 15-1 to 15-n write the ATM cell over an idle cell or an invalid cell. Consequently, the ATM concentrator shown in FIG. 3 selects ATM cells having predetermined VPI, VCI, and CLP bit and a predetermined quality class from input signals supplied from the (n×m) input highways, and supplies the selected ATM cells to the n highways. The ATM concentrator outputs ATM cells at a speed which is m times the speed at which they are inputted to the ATM concentrator.

Operation of the (m×n−n) ATM concentrator shown in FIG. 3 which has the full priority control capability will be described below. When ATM cells arrive at the ATM concentrator, the sorting units 1, 2 sort, for respective quality classes, those ATM cells having predetermined VPI, VCI, and CLP bit. If ATM cells are valid cells of the high priority class, then they are sorted by the sorting unit 1, and stored in the output cell buffers 3-1 to 3-n for the high priority class at a speed which is m times the speed at which the ATM cells are inputted. Likewise, if ATM cells are valid cells of the low priority class, then they are sorted by the sorting unit 2, and stored in the output cell buffers 6-1 to 6-n for the low priority class at a speed which is m times the speed at which the ATM cells are inputted.

The number of valid cells among a total of n ATM cells to be read from the output cell buffers 3-1 to 3-n at a next readout time is counted and written in the valid cell number table 4 for the high quality class. Similarly, the number of valid cells among a total of n ATM cells to be read from the output cell buffers 6-1 to 6-n at a next readout time is counted and written in the valid cell number table 7 for the low-quality class.

The selector 39 reads ATM cells, one by one, from the cell output positions of the output cell buffers 3-1 to 3-n for the high-quality class in each output selector slot. At the same time, the readout controller 38 reads the number of valid cells among ATM cells at the cell output positions of the output cell buffers 3-1 to 3-n from the valid cell number table 4. The readout controller 38 checks if the number of valid cells of the high priority class is 0 or not. If the number of valid cells of the high priority class is 1 or more, then the readout controller 38 outputs a select signal to the selector 39 to output n pieces of the ATM cells read from the output cell buffers 3-1 to 3-n. If the number of valid cells of the high priority class is 0, then the readout controller 38 outputs a select signal to the selector 39 to output ATM cells from the output cell buffers 6-1 to 6-n for the low quality class.

Therefore, if a select signal received from the readout controller 38 represents the selection of the class 1 (high priority class), then the selector 39 outputs the n ATM cells read from the output cell buffers 3-1 to 3-n for the high quality class, one by one, to the n output highways. If a select signal received from the readout controller 38 represents the selection of the class 2 (low priority class), then the selector 39 reads ATM cells from the cell output positions of the output cell buffers 6-1 to 6-n for the low quality class, and outputs n ATM cells, one by one, to the n output highways.

The conventional ATM concentrator shown in FIG. 3 is disadvantageous in that if the n ATM cells read from the output cell buffers 3-1 to 3-n for the high priority class which corresponds to a high quality class include even one valid cell, then the ATM concentrator does not output any ATM cells of a quality class lower than the high quality class, with the result that the throughput of the ATM concentrator will not increase. This is because when ATM cells arrive at such an interval that k valid cells (k is an integer in the range of $1 \leq k < n$) are always stored in any of the output cell buffers 3-1 to 3-n for the high priority class, the k valid cells are outputted from only the output cell buffers 3-1 to 3-n, but valid cells of the class 2 stored in the output cell buffers 6-1 to 6-n are not outputted at all, and idle cells and invalid cells are outputted from (n−k) of the output highways of the ATM concentrator whereas valid cells are transmitted through k highways.

For example, when ATM cells arrive at such an interval that while valid cells of the class 2 arrive highly frequently at the ATM concentrator, valid cells of the class 1 arrive less frequently at the ATM concentrator though one valid cell of the class 1 is always stored in any one of the output cell buffers 3-1 to 3-n, valid cells are outputted from only the output cell buffers 3-1 to 3-n, but any valid cells of the class 2 stored in the output cell buffers 6-1 to 6-n are not outputted at all, and idle cells and invalid cells are outputted from (n−1) of the output highways of the ATM concentrator whereas valid cells are transmitted through only one highway. As a result, the utilization factor of the highways does not increase, and the throughput of the ATM concentrator does not increase.

SUMMARY OF THE INVENTION

It is, therefore, an object of the present invention to provide an ATM concentrator of an (m×n−1) configuration which has output cell buffers assembled together into as many groups as the number of quality classes established for ATM cells, for carrying out full priority control for outputting valid cells of a higher priority class in preference to valid cells of a lower priority class, the ATM concentrator being capable of multiplexing and outputting valid cells of both the higher and lower priority class when the number of valid cells of the higher priority class in n output highways is small, for thereby increasing the utilization factor of the highways and the ATM concentrator throughput.

According to the present invention, the above object can be accomplished by an ATM concentrator having (m×n) input highways and n output highways and established CL quality classes ranging from a quality class 1 of highest priority to a quality class CL of lowest priority, for performing a priority control process for outputting cells of a quality class of relatively high priority in preference to cells of a quality class of relatively low priority, where each of m, n, CL is an integer of 2 or greater, comprising:

output cell buffers for the respective quality classes, associated respectively with the output highways;

a readout controller for checking the number of valid cells of cells read from the n output highways for each of the quality classes, determining a quality class c with respect to which an accumulated value of the numbers of valid cells calculated successively from quality classes of higher priority is maximum within the total number n of the output highways, generating a multiplexing control signal to instruct the output cell buffers of the quality class 1 to output n cells if the determined quality class c is the quality class 1, and checking highways corresponding to valid cells of cells read from the output cell buffers of the quality classes 2 through c and generating a multiplexing control signal to instruct writing of valid cells of the quality classes 2 through c over highways corresponding to cells which are not valid cells, of cells read from the output cell buffers of the quality class 1, if the determined quality class c is a quality class other than the quality class 1; and a quality class multiplexer for outputting n cells read from the output cell buffers of the quality class 1 according to the multiplexing control signal or outputting a total of n cells produced by multiplexing the valid cells read from the output cell buffers of the quality classes 2 through c with n cells read from the output cell buffers of the quality class 1 based on the multiplexing control signal, to the n output highways;

whereby priority control of the quality class of relatively high priority and the quality class of relatively low priority can be carried out based on the multiplexing control signal generated by the readout controller.

The above and other objects, features and advantages of the present invention will become apparent from the following description with reference to the accompanying drawings which illustrate examples of the present invention.

DESCRIPTION OF THE PREFERRED EMBODIMENTS

Figure 1:
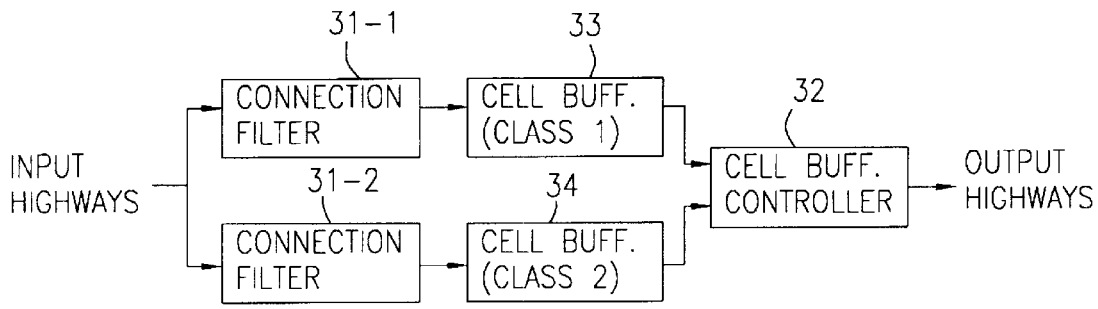
FIG. 1 is a block diagram of a conventional ATM cell buffer for carrying out priority control based on quality classes.
Figure 2:
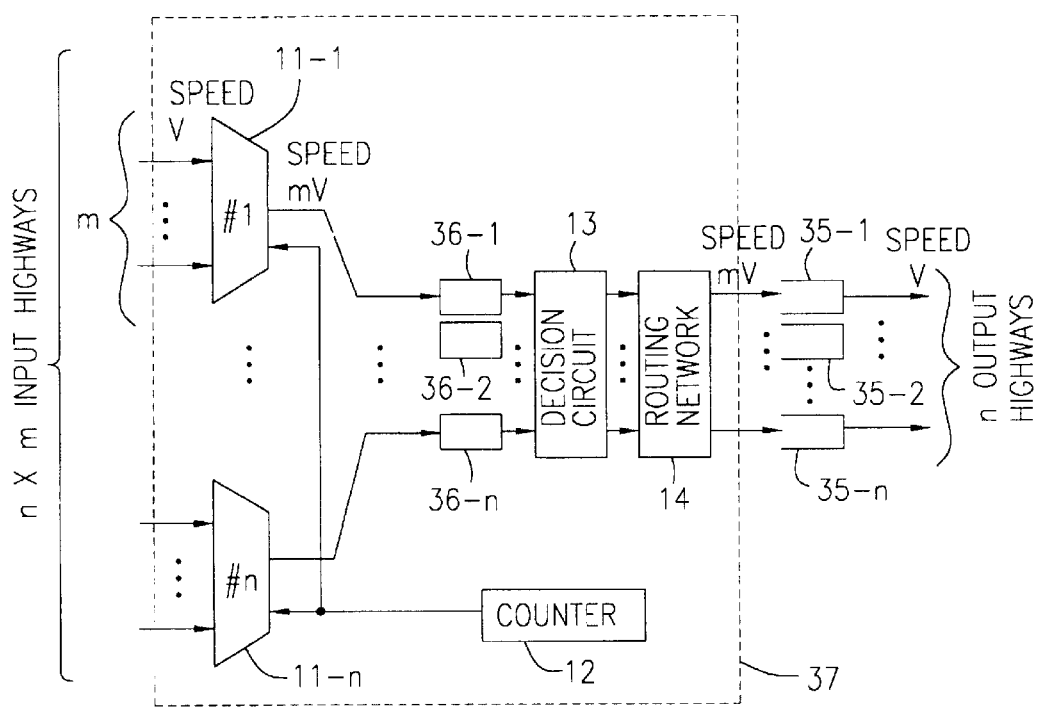
FIG. 2 is a block diagram of a conventional ATM concentrator.
Figure 3:
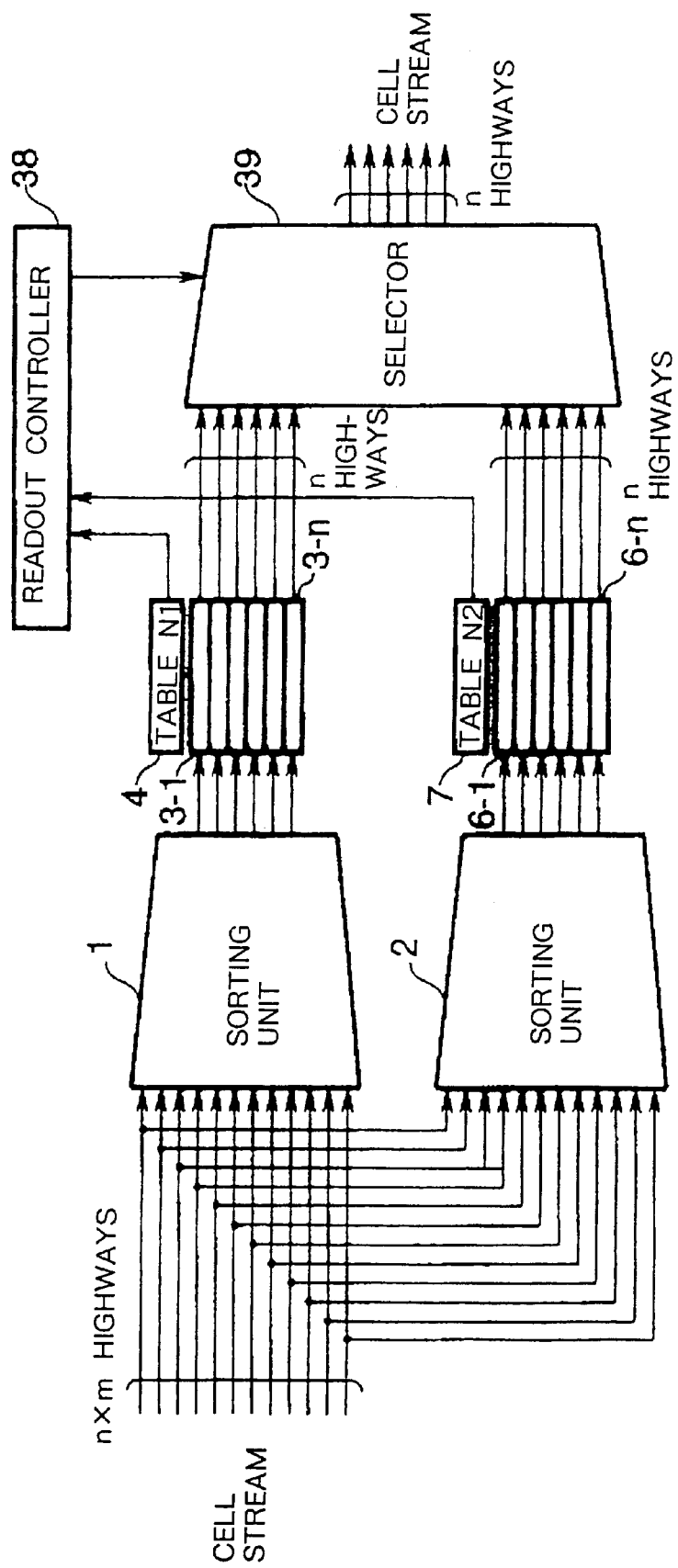
FIG. 3 is a block diagram of another conventional ATM concentrator for carrying out full priority control based on quality classes.
Figure 4:
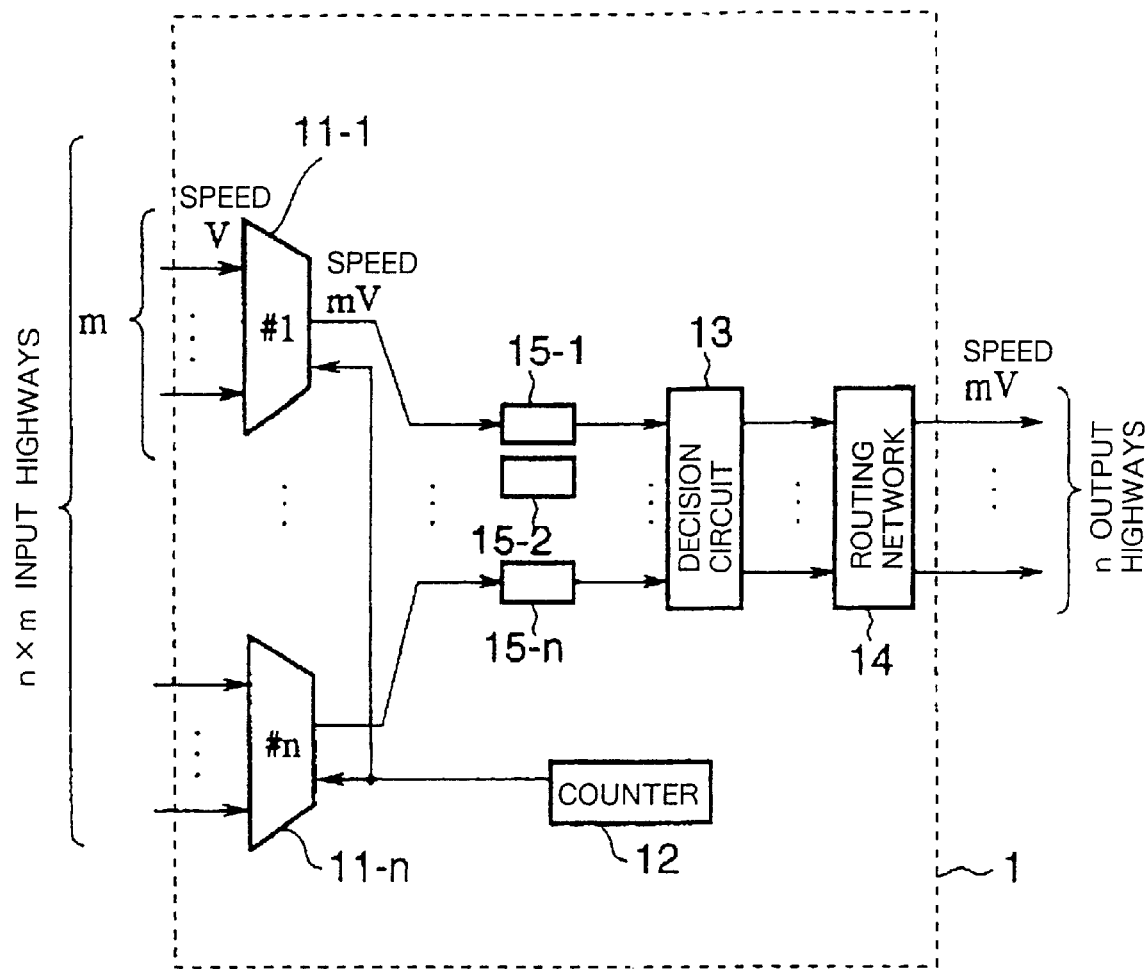
FIG. 4 is a block diagram of an example of a sorting unit.
Figure 5:
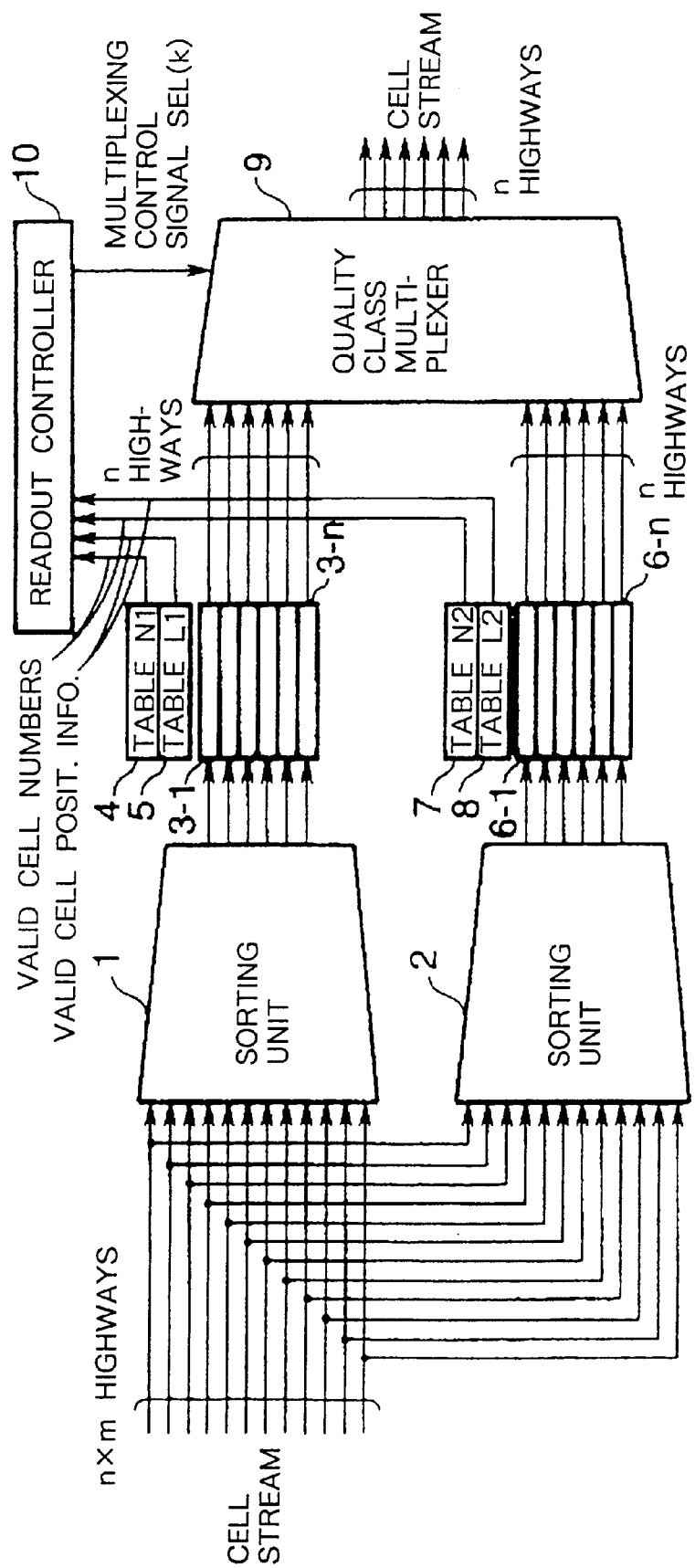
FIG. 5 is a block diagram of an ATM concentrator according to a first embodiment of the present invention.

An ATM concentrator according to a first embodiment of the present invention, which is shown in FIG. 5, has a priority control capability and can be used in an ATM exchange or an ATM cross-connect. Those blocks shown in FIG. 5 which are represented by reference characters that are identical to those shown in FIGS. 1 to 4 have functions identical to those functions represented by the identical reference characters shown in FIGS. 1 to 4.

As shown in FIG. 5, the ATM concentrator has a sorting unit 1 for the high priority class and a sorting unit 2 for the low priority class. The sorting units 1, 2 select only valid cells belonging to corresponding quality classes, and concentrate input signals from (n×m) input highways to n output highways. The sorting units 1, 2 are supplied with the same cell signals. The sorting unit 1 for the high priority class has n pieces of output terminals connected respectively to output cell buffers 3-1 to 3-n for the high priority class, and the sorting unit 2 for the low priority class has n pieces of output terminals connected respectively to output cell buffers 6-1 to 6-n for the low priority class.

The output cell buffers 3-1 to 3-n for the high quality class are associated with a valid cell number table 4 for holding the number N1 of valid cells present at the cell output positions of the output cell buffers 3-1 to 3-n and a valid cell positional information table 5 for holding positional information L1 representing which of the output cell buffers 3-1 to 3-n the N1 valid cells are stored in. Similarly, the output cell buffers 6-1 to 6-n for the low quality class are associated with a valid cell number table 7 for holding the number N2 of valid cells present at the cell output positions of the output cell buffers 6-1 to 6-n and a valid cell positional information table 8 for holding positional information L2 representing which of the output cell buffers 6-1 to 6-n the N2 valid cells are stored in.

The ATM concentrator also has a quality class multiplexer 9 for multiplexing stored cells outputted from the output cell buffers 3-1 to 3-n for the high quality class and stored cells outputted from the output cell buffers 6-1 to 6-n for the low quality class. A readout controller 10 determines in each cell slot which of the stored cells in the output cell buffers 3-1 to 3-n and the output cell buffers 6-1 to 6-n are to be multiplexed by the quality class multiplexer 9, based on the valid cell number information N1, N2 held in the valid cell number tables 4, 7, respectively, and the valid cell positional information L1, L2 held in the valid cell positional information tables 5, 8, respectively. The readout controller 10 delivers a multiplexing control signal SEL(k) (k is an integer in the range of from 1 to n) to the quality class multiplexer 9.

Each of the sorting units 1, 2 is arranged as shown in FIG. 4. Specifically, each of the sorting units 1, 2 comprises n pieces of (m−1) selectors 11-1 to 11-n, a counter 12 for the n (m−1) selectors 11-1 to 11-n, a routing decision circuit 13, a routing circuit 14 comprising an (n×n) Banyan switch, and n pieces of connection quality class filters 15-1 to 15-n.

A processing sequence of the ATM concentrator shown in FIG. 5 will be described below with reference to FIGS. 6 and 7.

When valid cells arrive at the sorting units 1, 2, the connection quality class filters 15-1 to 15-n in each of the sorting units 1, 2 check the VPI or the VCI or both and the CLP bit in the header of each of the valid cells to decide whether the valid cell belongs to a passing connection to pass through the sorting unit. If the valid cell belongs to a passing connection, then the connection quality class filters 15-1 to 15-n determine the quality class of the valid cell from the VPI, the VCI, and the CLP bit thereof to decide whether the quality class is a quality class to pass through the sorting unit. If the quality class is a quality class to pass through the sorting unit, then the valid cell is introduced into the sorting unit 1 for the high quality class or the sorting unit 2 for the low quality class. If the valid cell does not belong to a passing connection or its quality class is not a quality class to pass through the sorting unit, then the connection quality class filters 15-1 to 15-n write the valid cell over an idle cell or an invalid cell. In this manner, valid cells are concentrated by the sorting unit 1 or 2, and supplied to the output cell buffers 3-1 to 3-n for the high quality class or the output cell buffers 6-1 to 6-n for the low quality class.

For storing n pieces of ATM cells supplied from the sorting unit 1 into the output cell buffers 3-1 to 3-n, the number N1 of valid cells among the n ATM cells is counted by the output cell buffers 3-1 to 3-n, and stored in the valid cell number table 4, and positional information L1 representing which of the highways HW1 to HWn the ATM cells belong to is stored in the valid cell positional information table 5.

Figure 6:
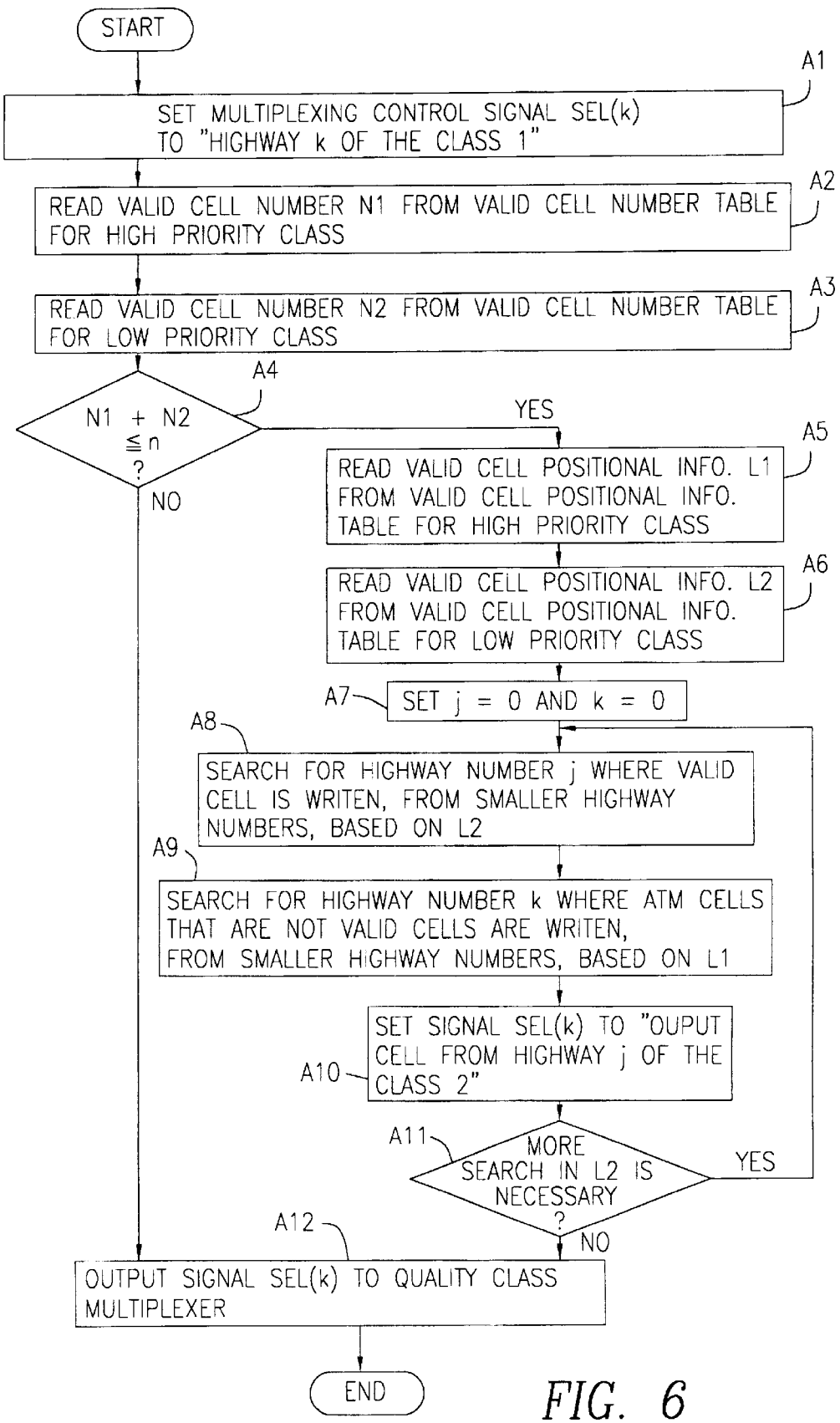
FIG. 6 is a flowchart of an operation sequence of a readout controller in the ATM concentrator shown in FIG.

As shown in FIG. 6, the readout controller 10 sets each of the multiplexing control signals SEL(k) for all the highways to "highway k of the class 1 (high priority class)" in each readout cell slot in step A1, where k is an integer in the range of from 1 to n. Then, the readout controller 10 reads the valid cell number N1 for the high priority class from the valid cell number table 4 in step A2, and reads the valid cell number N2 for the low priority class from the valid cell number table 7 in step A3. Thereafter, the readout controller 10 calculates the sum of both valid cell numbers N1 and N2, and compares the sum of N1+N2 with the total number n of the output highways in step A4. If the sum of N1+N2 exceeds the total number n, then the readout controller 10 sends the multiplexing control signal SEL(k) to the quality class multiplexer 9 at step A12, after which the operation sequence shown in FIG. 6 comes to an end.

If the sum of N1+N2 is equal to or smaller than the total number n at step A4, the readout controller 10 reads the valid cell positional information Li for the high priority class from the valid cell positional information table 5 in step A5 and also reads the valid cell positional information L2 for the low priority class from the valid cell positional information table 8 in step A6. Then, the readout controller 10 initializes each of internal variables j, k to 1 in step A7. The readout controller 10 searches for a highway number j where valid cells are written, successively from smaller highway numbers, based on the low priority class valid cell positional information L2 in step A8. Then, the readout controller 10 searches for a highway number k where ATM cells that are not valid cells, e.g., idle cells and invalid cells, are written, successively from smaller highway numbers, based on the valid cell positional information L1 in step A9. Thereafter, the readout controller 10 sets the multiplexing control signal SEL(k) for the highway k to "output a cell from highway j of the class 2" in step A10. In step A11, the readout controller 10 decides whether it is necessary to further search for valid cells in the low priority class valid cell positional information L2 or not. Steps A8 to A10 are repeatedly executed until it is not necessary to further search for valid cells in the low priority class valid cell positional information L2. Thereafter, the readout controller 10 sends the multiplexing control signal SEL(k) to the quality class multiplexer 9 in step A12. The operation sequence of the readout controller 10 shown in FIG. 6 is now ended.

Figure 7:
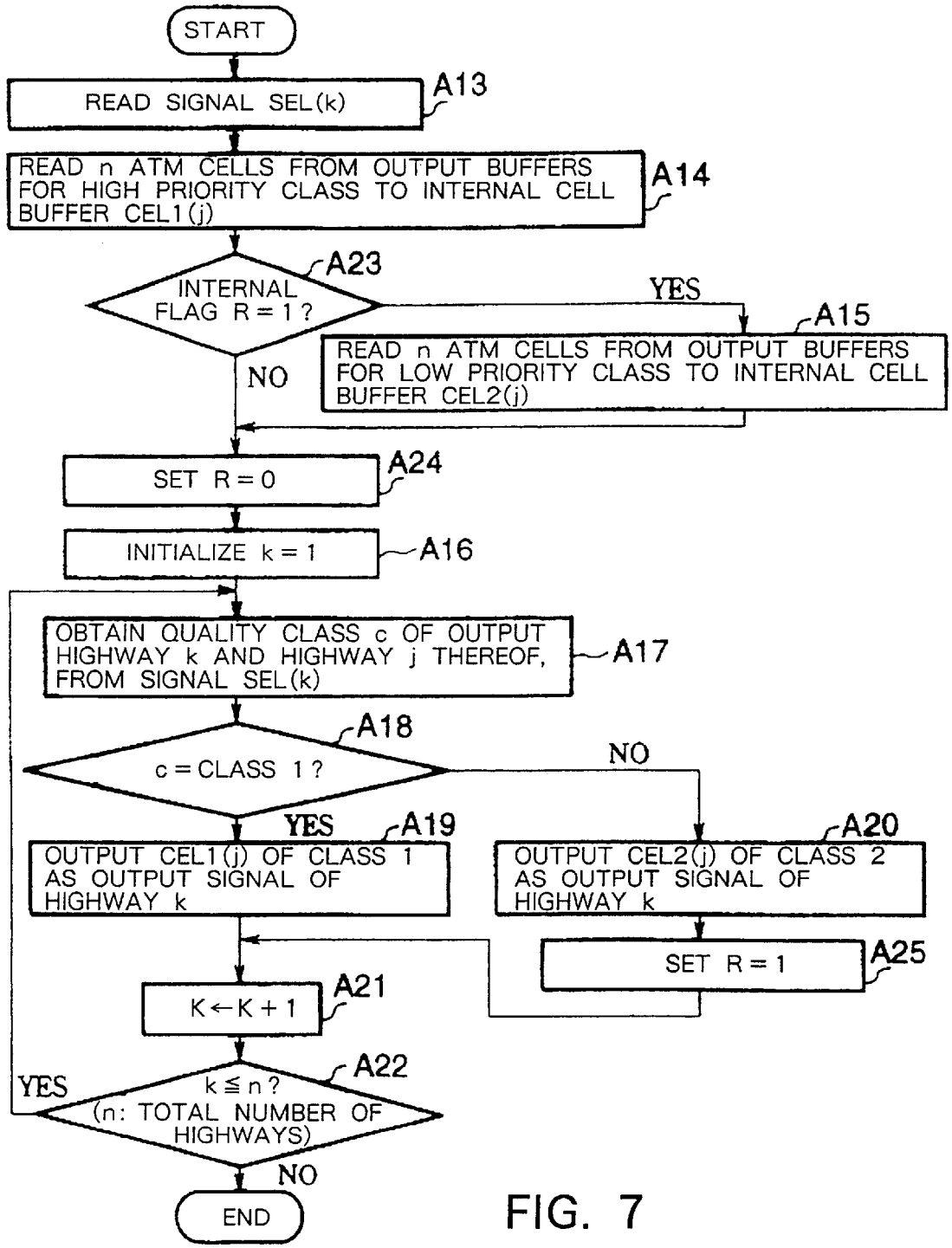
FIG. 7 is a flowchart of an operation sequence of a quality class multiplexer in the ATM concentrator shown in FIG. 5.

The quality class multiplexer 9 reads the multiplexing control signal SEL(k) from the readout controller 10 in each readout cell slot in step A13 shown in FIG. 7. The quality class multiplexer 9 reads ATM cells, one by one, from the output cell buffers 3-1 to 3-n into an internal cell buffer CEL1(j) (j is an integer in the range of from 1 to n) in step A14. Then, the quality class multiplexer 9 checks, in step A23, an internal flag R indicative of whether valid cells of the class 2 were outputted in a preceding cell slot or not. The internal flag R is initially set to 1. If the internal flag R is R=1 in step A23, then the quality class multiplexer 9 reads ATM cells, one by one, from the output cell buffers 6-1 to 6-n into an internal cell buffer CEL2(j) in step A15. Thereafter, the quality class multiplexer 9 resets the internal flag R to 0 in step A24. If the internal flag R is R=0 in step A23, then the quality class multiplexer 9 does not read cells from the output cell buffers 6-1 to 6-n, but resets the internal flag R to 0 in step A24.

After step A24, the quality class multiplexer 9 initializes an internal variable k representing a highway number to 1 in step A16, and obtains a quality class c of a cell to be outputted from a highway indicated by the highway number k and a highway number j of a highway to output a cell, from the multiplexing control signal SEL(k) in step A17. The quality class multiplexer 9 then decides whether the quality class c is the class 1 (high priority class) or not in step A18. If the quality class c is the class 1, then the quality class multiplexer 9 outputs an ATM cell from the j-th internal cell buffer CEL1(j) of the class 1 as an output cell of the highway k in step A19. If the quality class c is not the class 1, then the quality class multiplexer 9 outputs an ATM cell from the j-th internal cell buffer CEL2(j) of the class 2 as an output cell of the highway k in step A20 and sets the internal flag R to a value 1 indicating that a valid cell of the class 2 has been transmitted in step A25. After step A19 or A25, the quality class multiplexer 9 adds 1 to k in step A21 in order to execute steps A17 to A20 and A25 up to the total number n of the output highways. Then, the quality class multiplexer 9 decides whether or not k is equal to or less than the total number n of the output highways in step A22. Here, if k is equal to or less than n, then control returns to step 17. If k exceeds n, then the operation sequence of the quality class multiplexer 9 shown in FIG. 7 is brought to an end.

Figure 8:
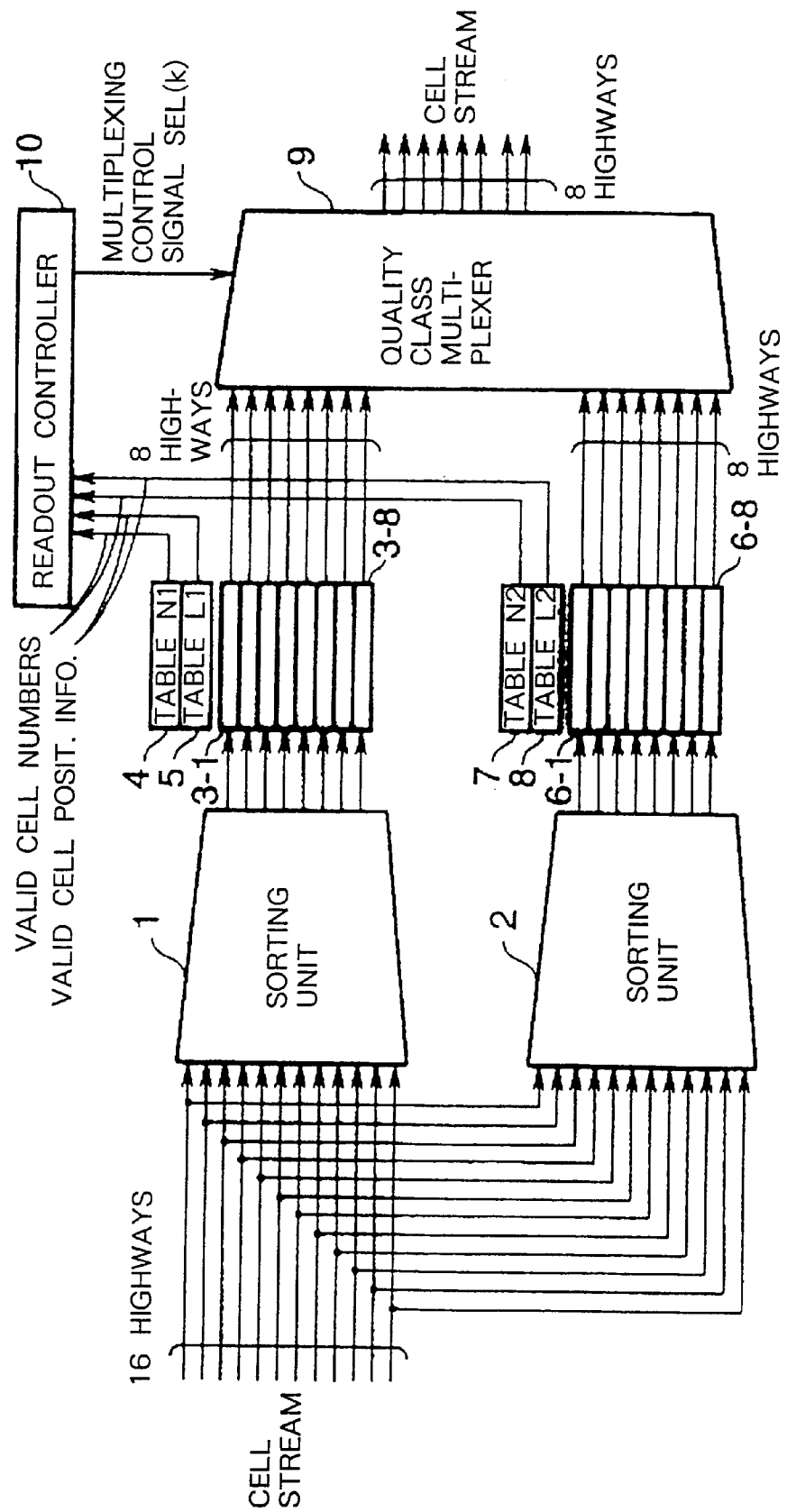
FIG. 8 is a block diagram of an ATM concentrator according to a second embodiment of the present invention.

A specific example of the ATM concentrator shown in FIG. 5 will be described below. FIG. 8 shows such a specific ATM concentrator as a second embodiment of the present invention. The ATM concentrator shown in FIG. 8 is equivalent to the ATM concentrator shown in FIG. 5 where m=2, n=8. The ATM concentrator shown in FIG. 8 has 16 (=m×n) input highways and 8 (=n) output highways, and has two quality classes, i.e., a class 1 (high priority class) and a class 2 (low priority class), established for carrying out full priority control with respect to delay quality classes. Those blocks shown in FIG. 8 which are represented by reference characters that are identical to those shown in FIG. 5 have functions identical to those functions represented by the identical reference characters shown in FIG. 5.

In the ATM concentrator shown in FIG. 8, each of the sorting unit 1 for the high priority class and the sorting unit 2 for the low priority class comprises digital logic circuits including counters, selectors, and flip-flops, for example. Each of the output cell buffers 3-1 to 3-8 for the high priority class and the output cell buffers 6-1 to 6-8 for the low priority class comprises an FIFO (First-In First-Out) memory, for example. Each of the valid cell number table 4 for holding the number N1 and the valid cell positional information table 5 for holding positional information L1 also comprises an FIFO memory, for example. Similarly, each of the valid cell number table 7 for holding the number N2 and the valid cell positional information table 8 for holding positional information L2 also comprises an FIFO memory, for example. The readout controller 10 transmits multiplexing control signals SEL(1) to SEL(8) to the quality class multiplexer 9. In response to the multiplexing control signals, the quality class multiplexer 9 multiplexes ATM cells present at the cell output positions of the output cell buffers 3-1 to 3-8 and the cell output positions of the output cell buffers 6-1 to 6-8, and transmit a total of 8 cells to the 8 output highways. The quality class multiplexer 9 and the readout controller 10 are implemented by digital logic circuits or software-implemented by a processor.

Figure 9:
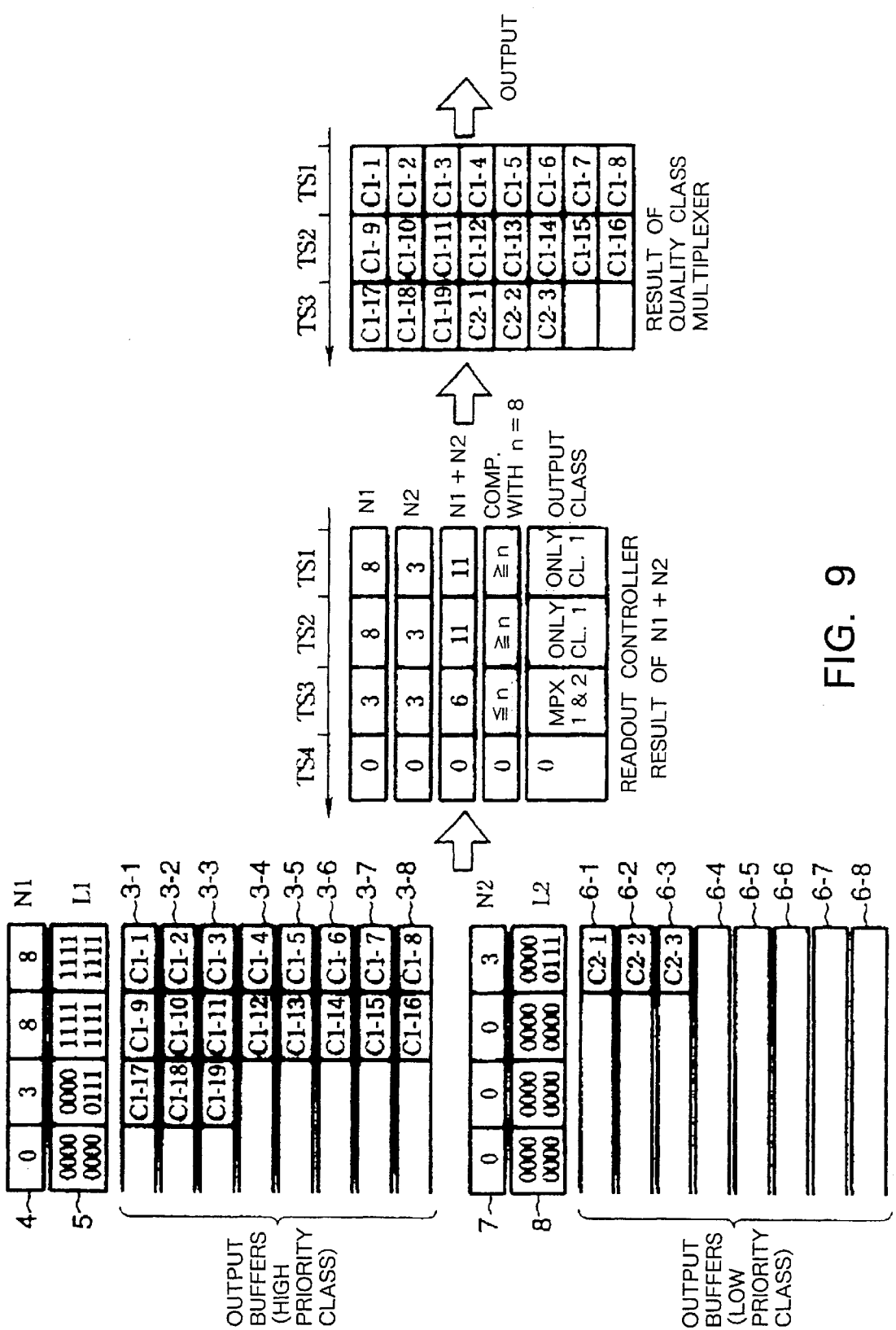
FIG. 9 is a diagram illustrative of a quality class multiplexing process carried out in the ATM concentrator shown in FIG. 8.

Operation of the quality class multiplexer 9 and the readout controller 10 of the ATM concentrator shown in FIG. 8 will be described below with reference to FIG. 9.

The output cell buffers 3-1 to 3-8 for the high priority class stores 19 valid cells C1-1 to C1-19 of the class 1, and the output cell buffers 6-1 to 6-8 for the low priority class stores 3 valid cells C2-1 to C2-3 of the class 2. The remaining areas of these buffers are filled with idle cells. If each of the output cell buffers 3-1 to 3-8 and the output cell buffers 6-1 to 6-8 comprises an FIFO memory, then the valid cells C1-1 to C1-8 are located respectively in the cell output positions of the output cell buffers 3-1 to 3-8, and the valid cells C2-1 to C2-3 are located in the cell output positions of 3 output cell buffers among the output cell buffers 6-1 to 6-8. Therefore, the number N1 of valid cells of the high priority class is "8", and the number N2 of valid cells of the low priority class is "3".

First, the readout controller 10 reads the number N1 (=8) of valid cells of the high priority class from the valid cell number table 4 and the number N2 (=3) of valid cells of the low priority class from the valid cell number table 7, and calculates N1+N2 at a time TS1. The sum of N1+N2 is 11. The readout controller 10 compares the sum of N1+N2 with n (=8). Since N1+N2>n, the 8 valid cells C1-1 to C1-8 of the class 1 are outputted at the time TS1.

In a next cell slot, the valid cells C1-9 to C1-16 are located in the cell output positions of the output cell buffers 3-1 to 3-8, and the valid cells C2-1 to C2-3 are located respectively in the cell output positions of the output cell buffers 6-1 to 6-8. Therefore, N1=8 and N2=3. The readout controller 10 reads N1 (=8) and N2 (=3) respectively from the valid cell number table 4 and the valid cell number table 7, and calculates N1+N2 at a time TS2. Since N1+N2 >n, the 8 valid cells C1-9 to C1-16 of the class 1 are outputted at the time TS2.

In a next cell slot, the valid cells C1-17 to C1-19 are located respectively in the cell output positions of 3 output cell buffers among the output cell buffers 3-1 to 3-8, and the valid cells C2-1 to C2-3 are located in the cell output positions of the output cell buffers 6-1 to 6-8. Therefore, N1=3 and N2=3. The readout controller 10 reads N1 (=3) and N2 (=3) respectively from the valid cell number table 4 and the valid cell number table 7, and calculates N1+N2 at a time TS3. The sum of N1+N2 is 6. Since N1+N2 <n, the 3 valid cells C1-16 to C1-19 of the class 1 and the 3 valid cells C2-1 to C2-3 of the class 2 are outputted at the time TS3.

If 8 valid cells of the class 1 were inputted at a time TS4, then the conventional ATM concentrator would not be able to output the valid cells C2-1 to C2-3 of the class 2 at the time TS4. The ATM concentrator according to this embodiment, however, is capable of multiplexing the valid cells of the class 2 with idle cells and outputting the valid cells of the class 2 at the time TS3. According to the present invention, therefore, the network utilization factor increases, and the throughput of the ATM concentrator increases.

In the ATM concentrators shown in FIGS. 5 and 8, here are two quality classes, i.e., the high priority class (class 1) and the low priority class (class 2). The ATM concentrators have as many sorting units, sets of output cell buffers, valid cell number tables, and valid cell positional information tables as the number of the quality classes. However, the principles of the present invention are not limited to two quality classes, but are also applicable to three or more quality classes. For classifying ATM cells into three or more quality classes, an ATM concentrator for performing a priority control function according to the present invention has as many sorting units, sets of output cell buffers, memories for storing the numbers of valid cells, and memories for storing the positions of valid cells as the number of the quality classes.

Figure 10:
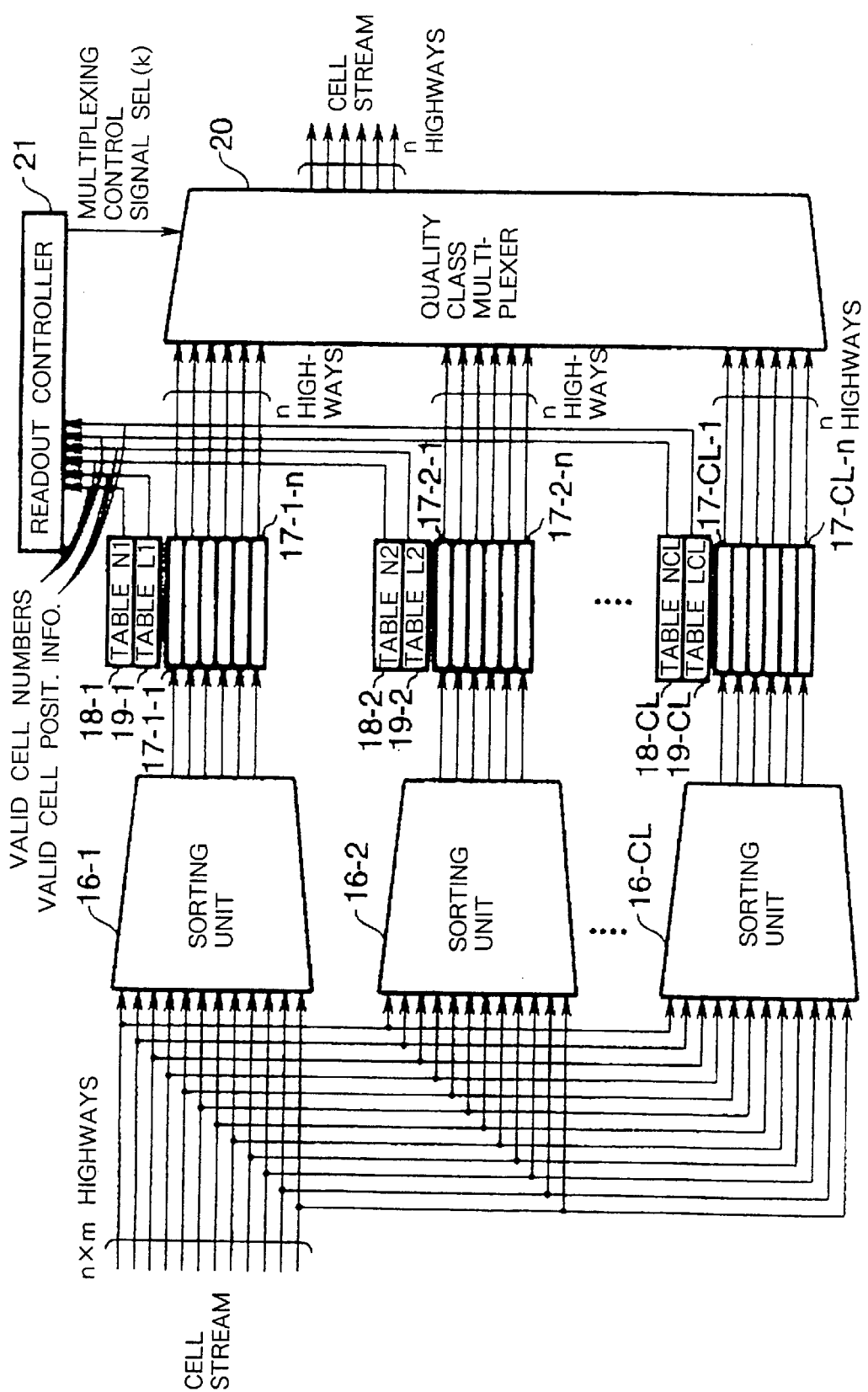
FIG. 10 is a block diagram of an ATM concentrator according to a third embodiment of the present invention.

FIG. 10 shows in block form an ATM concentrator according to a third embodiment of the present invention. The ATM concentrator shown in FIG. 10 is an (m×n−n) ATM concentrator having a full priority control function with an arbitrary number CL of quality classes where CL is an integer of 2 or more.

As shown in FIG. 10, the ATM concentrator according to the third embodiment has CL pieces of sorting units 16-1 to 16-CL for different quality classes to which (n×m) input highways are connected parallel to each other. The sorting units 16-1 to 16-CL have output terminals connected to sets of output cell buffers 17-1-1 to 17-CL-n for the respective quality classes. The ATM concentrator has valid cell number tables 18-1 to 18-CL for holding the numbers of valid cells of the respective quality classes and valid cell positional information tables 19-1 to 19-CL for holding valid cell positional information of the respective quality classes. A total of (n×CL) highways from the output cell buffers 17-1-1 to 17-CL-n are connected to a quality class multiplexer 20, which is connected to n output highways. The quality class multiplexer 20 serves to read cells from the output cell buffers 17-1-1 to 17-CL-n and multiplexes the cells. The quality class multiplexer 20 is controlled by a multiplexing control signal from a readout controller 21. The readout controller 21 outputs the multiplexing control signal based on valid cell number information read from the valid cell number tables 18-1 to 18-CL and valid cell positional information read from the valid cell positional information tables 19-1 to 19-CL. Each of the sorting units 16-1 to 16-CL comprises a circuit equivalent to those of the sorting units of the ATM concentrator shown in FIG. 5.

Figure 11:
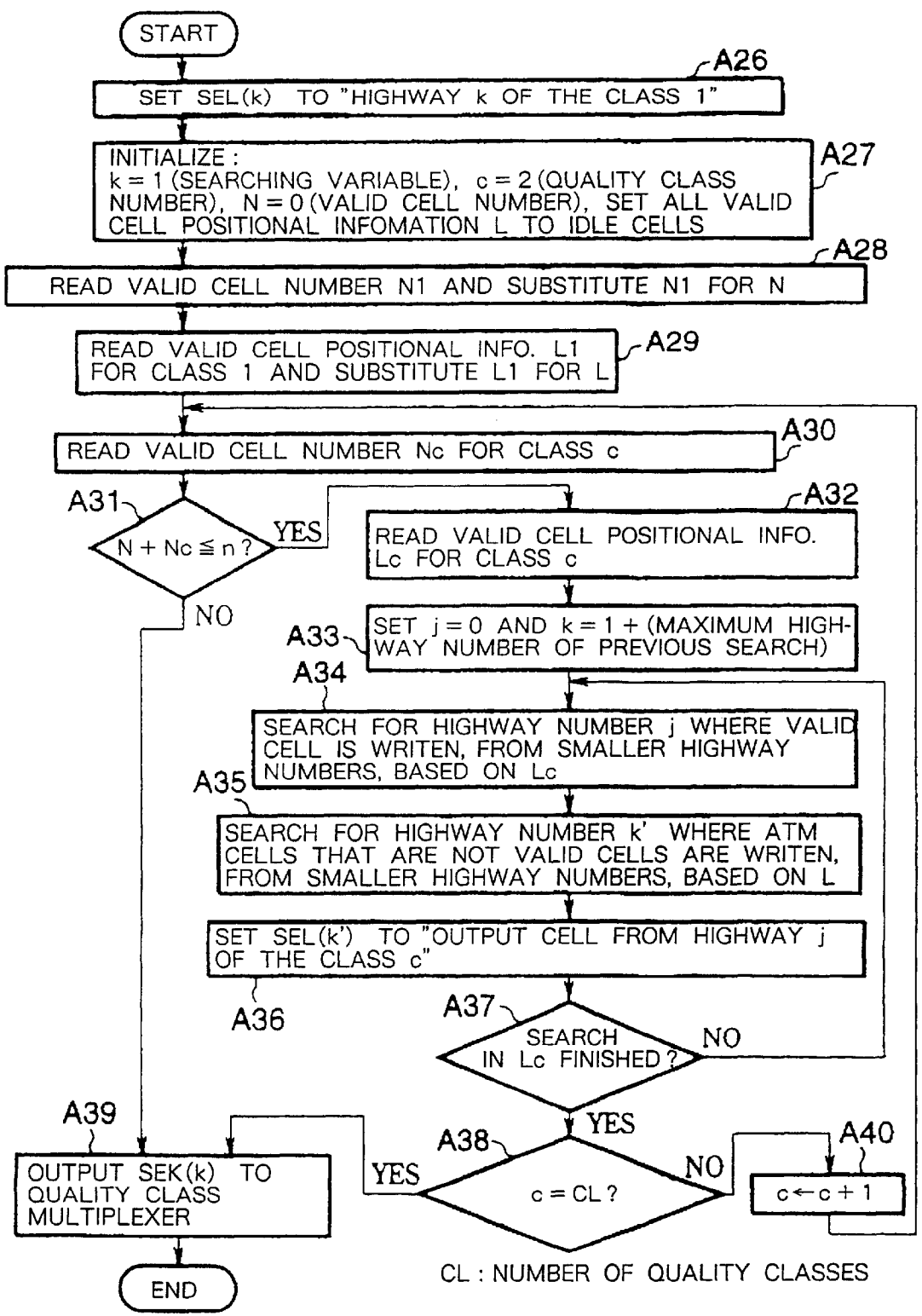
FIG. 11 is a flowchart of an operation sequence of a readout controller in the ATM concentrator shown in FIG. 10.

A processing sequence of the ATM concentrator shown in FIG. 10 will be described below with reference to FIGS. 11 and 12.

The readout controller 21 sets each of the multiplexing control signals SEL(k) for all the highways to a "highway k of the class 1 (high priority class)" in each readout cell slot in step A26, where k is an integer in the range of from 1 to n. Then, the readout controller 21 initializes internal variables, i.e., sets a searching variable k to 1, a quality class number c to 2, a valid cell number N to 0, and valid cell positional information L all to idle cells, in step A27. The readout controller 21 then reads a valid cell number N1 of the class 1 from the valid cell number table 18-1 and substitutes the valid cell number N1 for N in step A28. The readout controller 21 reads valid cell positional information L1 of the class 1 from the valid cell positional information table 19-1 and substitutes the valid cell positional information L1 for L in step A29.

Thereafter, the readout controller 21 reads the valid cell number Nc of the class c from the valid cell number table 18-c in step A30, and compares the sum of N+Nc with the total number n of the output highways in step A31. If N+Nc>n, then the readout controller 21 sends the multiplexing control signal SEL(k) to the quality class multiplexer 20 in step A39, after which the operation sequence shown in FIG. 11 comes to an end.

If N+Nc≦n at step A31, the readout controller 21 reads valid cell positional information Lc of the class c from the valid cell positional information table 19-c in step A32. The readout controller 21 initializes an internal variable j to j=1, and also sets the variable k to a sum of 1 and the maximum highway number which has previously been searched for, in step A33. Then, the readout controller 21 searches for a highway number j where valid cells are written, successively from smaller highway numbers, based on the valid cell positional information Lc of the class c in step A34. Then, the readout controller 21 searches for a highway number k' where ATM cells that are not valid cells, e.g., idle cells and invalid cells, are written, successively from smaller highway numbers equal to or greater than k, based on the valid cell positional information L in step A35. Thereafter, the readout controller 21 sets the multiplexing control signal SEL(k') for the highway k' to a "Output a cell from highway j of the class c" in step A36.

In step A37, the readout controller 21 decides whether the process of searching for valid cells in the valid cell positional information Lc is finished or not in order to repeat steps A34 to A36 until the process of searching for valid cells in the valid cell positional information Lc is finished. If the process of searching is not finished, then control goes back to step A34. If the process of searching is finished, then the readout controller 21 decides whether an internal variable c representing a quality class is CL or not in step A38 in order to repeat steps A32 to A37 for all the quality classes. If c=CL, then the readout controller 21 sends the multiplexing control signal SEL(k) to the quality class multiplexer 20 in step A39 and the operation sequence of the readout controller 21 shown in FIG. 11 is now ended. If c<CL at step A38, then the readout controller 21 adds 1 to the internal variable c, after which control returns to step A30.

Figure 12:
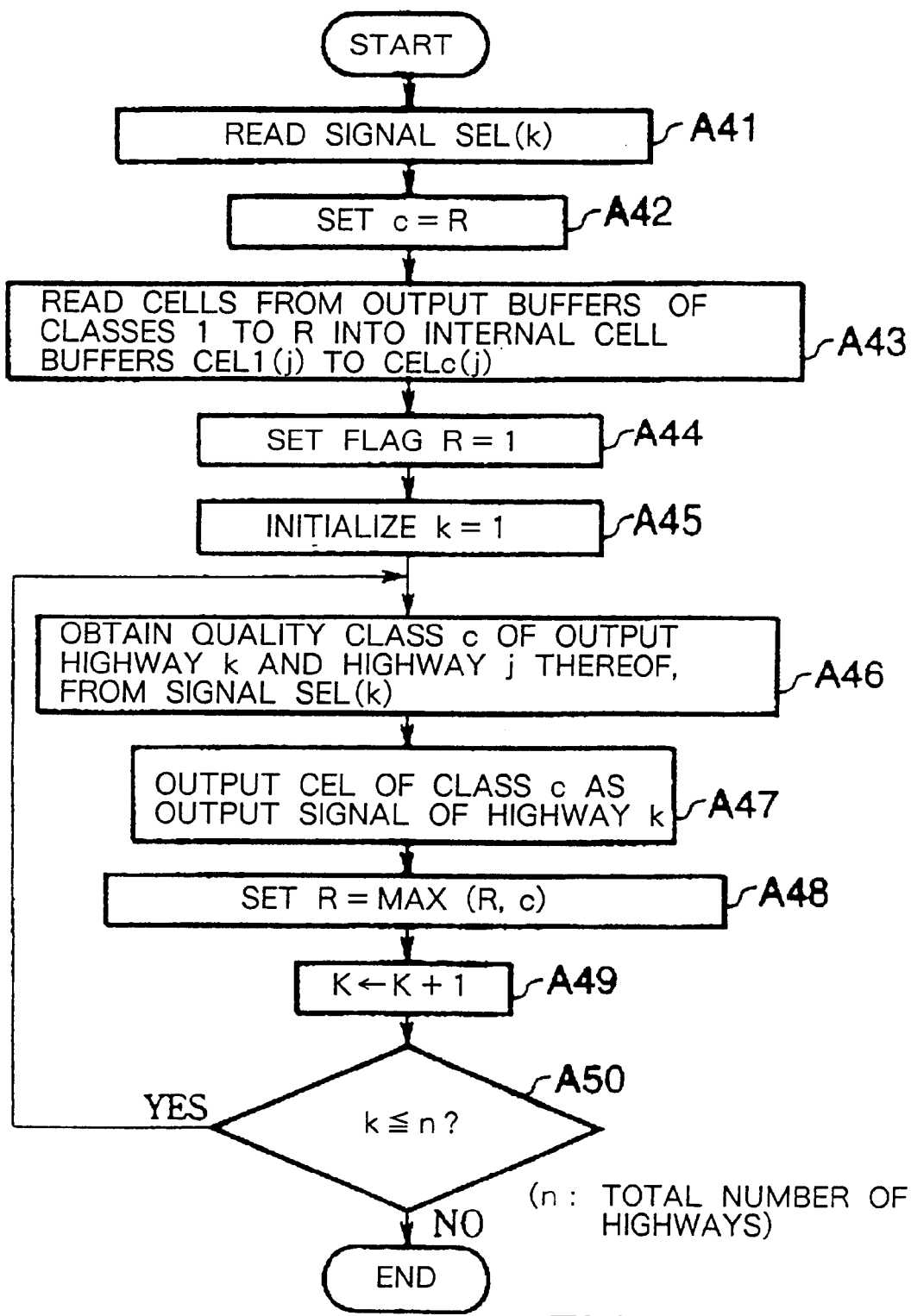
FIG. 12 is a flowchart of an operation sequence of a quality class multiplexer in the ATM concentrator shown in FIG. 10.

The quality class multiplexer 20 reads the multiplexing control signal SEL(k) from the readout controller 21 in each readout cell slot in step A41 shown in FIG. 12. The quality class multiplexer 20 sets the internal variable c to R, R representing an internal signal indicating up to which quality class valid cells have been outputted in the preceding cell slot, in step A42. The quality class multiplexer 20 reads ATM cells, one by one, from each of the output cell buffers 17-1-1 to 17-c-n of the classes 1 to n into internal cell buffers CEL1(j) to CELc(j) (j is an integer in the range of from 1 to n) in step A43. Then, the quality class multiplexer 20 resets the internal signal R to R=1 in step A44, and initializes the internal variable k indicative of a highway number to k=1 in step A45. The quality class multiplexer 20 obtains a quality class c of a cell to be outputted from a highway indicated by the highway number k and a highway number j of a highway to output a cell, from the multiplexing control signal SEL(k) in step A46. The quality class multiplexer 20 then outputs an ATM cell from the j-th internal cell buffer CELc(j) of the class c as an output cell of the highway k in step A47. The quality class multiplexer 20 sets an internal flag indicating up to which quality class valid cells have been outputted, to either R or c which is greater than the other.

The quality class multiplexer 20 adds 1 to k in step A49 in order to execute steps A46 to A48 up to the total number n of the output highways. Then, the quality class multiplexer 20 decides whether or not k is equal to or less than the total number n of the output highways in step A50. If k is equal to or less than n, then control returns to step A46. If k exceeds n, then the operation sequence of the quality class multiplexer 20 shown in FIG. 12 is brought to an end.

The ATM concentrator shown in FIG. 10 has the valid cell positional information tables 19-1 to 19-CL to obtain valid cell positional information L1 to LCL of the respective quality classes. However, the ATM concentrator may not have the valid cell positional information tables 19-1 to 19-CL. If the valid cell positional information tables are dispensed with, then when ATM cells are read from the output cell buffers, the readout controller 21 and the quality class multiplexer 20 refer to the headers of the read ATM cells to decide whether the ATM cells are valid cells or not, and obtain valid cell positional information L1 to LCL based on the determined result.

The ATM concentrator shown in FIG. 10 has the valid cell number tables 18-1 to 18-CL to obtain valid cell number information N1 to NCL. However, the ATM concentrator may not have the valid cell number tables 18-1 to 18-CL. If the valid cell number tables are dispensed with, then when ATM cells are read from the output cell buffers, the readout controller 21 and the quality class multiplexer 20 refer to the headers of the read ATM cells to decide whether the ATM cells are valid cells or not, and obtain valid cell numbers N1 to NCL.

In the ATM concentrator shown in FIG. 10, the cell positional information is not limited to any particular form. According to an alternative, for example, a bit string having as many bits as the number of the output highways is be prepared, and the output highways are assigned sequentially to the bits. If valid cell is stored in the cell buffer of an output highway, then "1" is entered into the bit corresponding to the output highway number, and if invalid cell or idle cell is stored in the cell buffer of an output highway, then "0" is entered into the bit corresponding to the output highway number. Alternatively, each output highway number where valid cell is stored may be stored in a memory.

Figure 13:
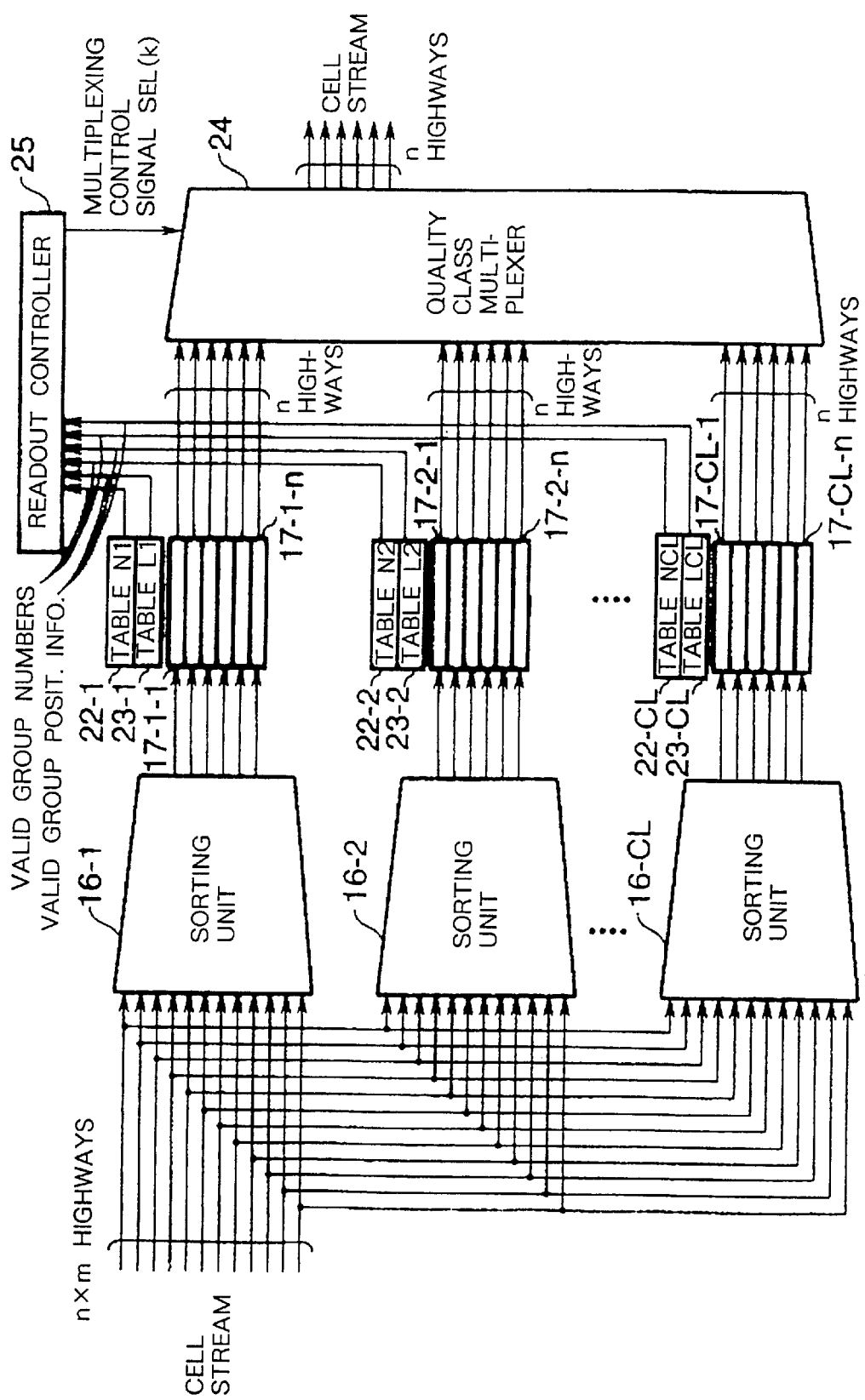
FIG. 13 is a block diagram of an ATM concentrator according to a fourth embodiment of the present invention.

FIG. 13 shows in block form an ATM concentrator according to a fourth embodiment of the present invention. The ATM concentrator shown in FIG. 13 is an (m×n–n) ATM concentrator having a full priority control function with n output highways put together into g highway groups (g<n) each for multiplexing quality classes. Those blocks shown in FIG. 13 which are represented by reference characters that are identical to those shown in FIG. 10 have functions identical to those functions represented by the identical reference characters shown in FIG. 10.

As shown in FIG. 13, the ATM concentrator according to the fourth embodiment has CL pieces of sorting units 16-1 to 16-CL for different quality classes to which (n×m) input highways are connected parallel to each other. The sorting units 16-1 to 16-CL have output terminals connected to output cell buffers 17-1-1 to 17-CL-n for the respective quality classes. A plurality of adjacent ones of the output cell buffers 17-1-1 to 17-CL-n are assigned to g groups each having an equal number of highways, the g groups being assigned respectively to the quality classes. The ATM concentrator has valid group number tables 22-1 to 22-CL for holding group numbers N1 to NCL of groups containing valid cells at the cell output positions of the output cell buffers 17-1-1 to 17-CL-n, out of the g groups of the respective quality classes, and valid group cell positional information tables 23-1 to 23-CL for holding valid group cell positional information L1 to LCN indicating which groups of the output cell buffers 17-1-1 to 17-CL-n valid cells are contained in at their cell output positions, out of the g groups of the respective quality classes. The group numbers N1 to NCL will also be referred to as valid group numbers. The ATM concentrator also has a quality class multiplexer 24 and a readout controller 25. The readout controller 25 outputs a multiplexing control signal to the quality class multiplexer 24 based on the group numbers N1 to NCL and the valid group cell positional information L1 to LCN.

Figure 14:
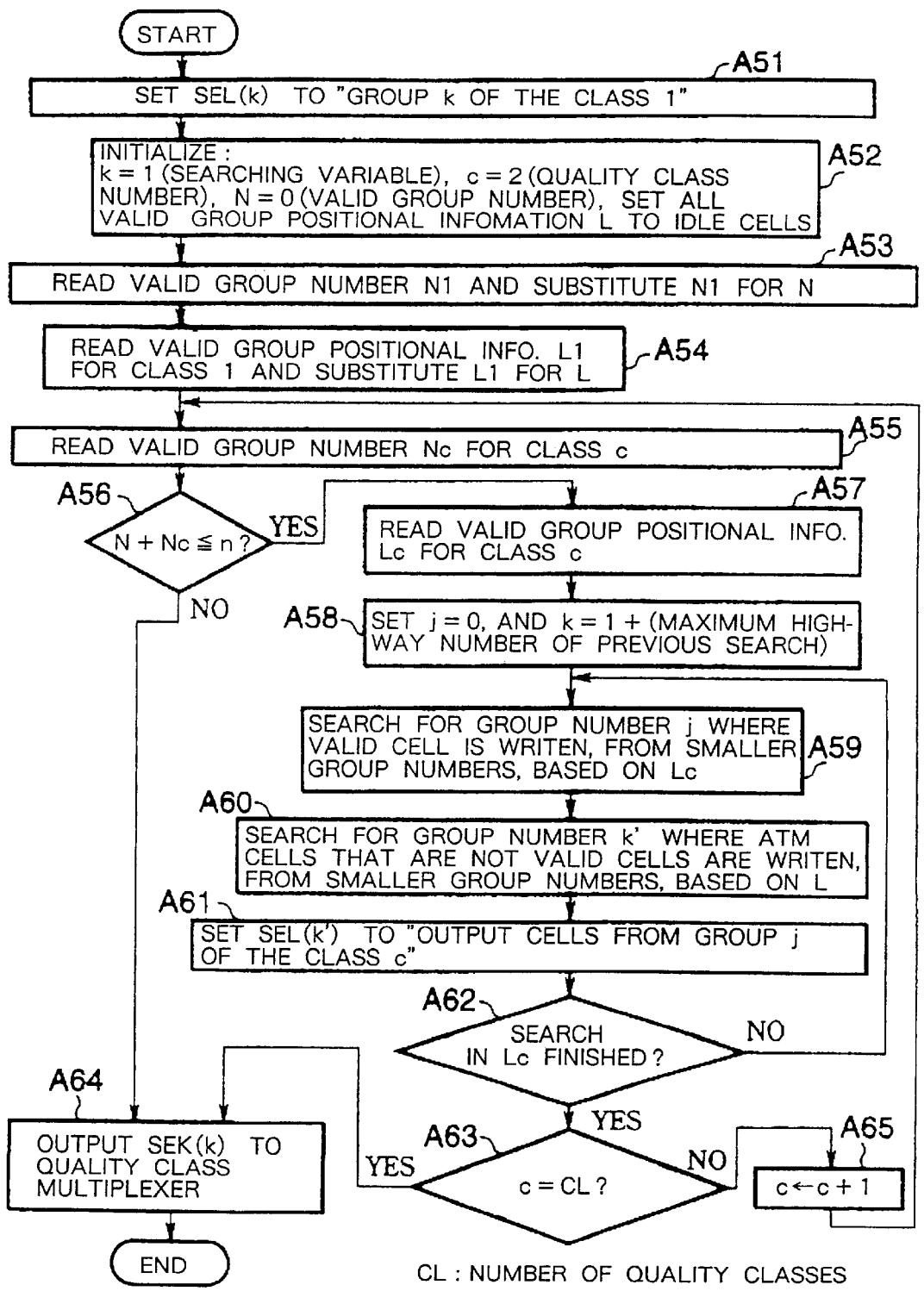
FIG. 14 is a flowchart of an operation sequence of a readout controller in the ATM concentrator shown in FIG. 13.
Figure 15:
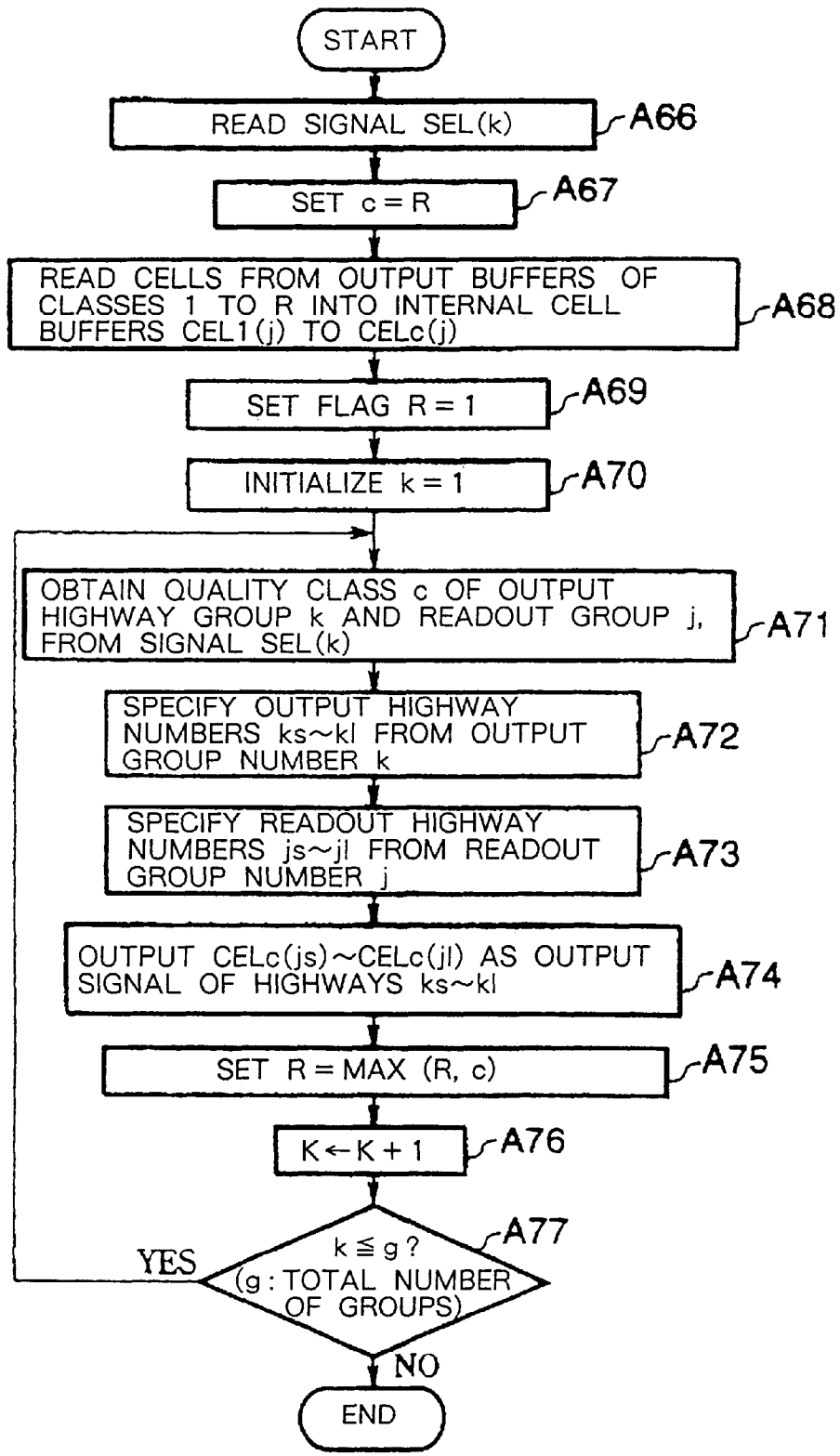
FIG. 15 is a flowchart of an operation sequence of a quality class multiplexer in the ATM concentrator shown in FIG. 13.

FIGS. 14 and 15 show operation sequences of the readout controller 25 and the quality class multiplexer 24, respectively.

The readout controller 25 sets the multiplexing control signal SEL(k) for the preceding group to a "group k of the class 1 (high priority class)" in each readout cell slot in step A51, where k is an integer in the range of from 1 to n. Then, the readout controller 25 initializes internal variables, i.e., sets a searching variable k to 1, a quality class number c to 2, a valid cell number N to 0, a valid group number N to 0, and valid group positional information L all to idle cells (groups), in step A52. The readout controller 25 then reads a valid group number N1 of the class 1 from the valid group number table 22-1 and substitutes the valid group number N1 for N in step A53. The readout controller 25 reads valid group positional information L1 of the class 1 from the valid group positional information table 23-1 and substitutes the information L1 for L in step A54.

Thereafter, the readout controller 25 reads the valid group number Nc of the class c from the valid group number table 22-c in step A55, and calculates and compares the sum of N+Nc with the total number n of the output groups in step A56. If N+Nc>n, then the readout controller 25 sends the multiplexing control signal SEL(k) to the quality class multiplexer 24 in step A64, after which the operation sequence shown in FIG. 14 comes to an end.

If N+Nc≦n at step A56, the readout controller reads valid group positional information Lc of the class c from the valid group positional information table 23-c in step A57. The readout controller 25 initializes an internal variable j to j=1, and also sets, in step A58, the variable k to a sum of 1 and the maximum group number which has previously been searched for. Then, the readout controller 25 searches for a group number j where valid cells are contained, successively from smaller group numbers, based on the valid group positional information Lc of the class c in step A59. Then, the readout controller 25 searches for a group number k' where valid cells are not contained, successively from smaller group numbers greater than k, based on the valid group positional information L in step A60. Thereafter, the readout controller 25 sets the multiplexing control signal SEL(k') for the readout group k' to a "output group j of the class c" in step A61.

In step A62, the readout controller 25 decides whether the process of searching for valid groups in the valid group positional information Lc is finished or not in order to repeat steps A59 to A61 until the process of searching for valid groups is finished. If the process of searching for valid groups is not finished, then control goes back to step A59. If the process of searching for valid groups is finished, then the readout controller 25 decides whether an internal variable c representing a quality class is CL or not in step A63 in order to repeat steps A57 to A62 for all the quality classes. If c=CL, then the readout controller 25 sends the multiplexing control signal SEL(k) to the quality class multiplexer 24 in step A64. The operation sequence of the readout controller 25 shown in FIG. 14 is now ended. If c<CL, then the readout controller 25 adds 1 to the internal variable c, after which control returns to step A55.

The quality class multiplexer 24 reads the multiplexing control signal SEL(k) from the readout controller 25 in each readout cell slot in step A66 shown in FIG. 15. The quality class multiplexer 24 sets the internal variable c to R, in step A67, R being an internal signal indicating up to which quality class valid cells have been outputted in the preceding cell slot, in step A67. The quality class multiplexer 24 reads ATM cells, one by one, from each of the output cell buffers 17-1-1 to 17-c-n of the classes 1 to n into internal cell buffers CEL1(j) to CELc(j) (j is an integer in the range of from 1 to n) in step A68. Then, the quality class multiplexer 24 resets the internal signal R to R=1 in step A69, and initializes the internal variable k indicative of an output group number to k=1 in step A70. The quality class multiplexer 24 obtains a quality class c of a cell to be outputted from a group indicated by the output group number k and a highway number j of a highway to output a cell, from the multiplexing control signal SEL(k) in step A71.

The quality class multiplexer 24 then specifies corresponding output highway numbers ks to kl from the output group numbers k in step A72, and specifies corresponding readout highway numbers js to jl from the highway numbers j in step A73. Each of ks, kl is a positive integer equal to or smaller than n, and they satisfy the relationship of ks<kl, and each of js, jl is a positive integer equal to or smaller than n, and they satisfy the relationship of js<jl. Thereafter, the quality class multiplexer 24 outputs ATM cells from the js-th to jl-th internal cell buffers CELc(js) to CELc(jl) of the class c as output cells of the output highways ks to kl in step A74. The quality class multiplexer 24 sets an internal flag R indicating up to which quality class valid cells have been outputted, to either R or c which is greater than the other.

The quality class multiplexer 24 adds 1 to k in step A76 in order to execute steps A71 to A75 up to the total number g of the output groups. Then, the quality class multiplexer 24 decides whether or not k is equal to or less than g in step A77. If k is equal to or less than g, then control returns to step A70. If k exceeds g, then the operation sequence of the quality class multiplexer 24 shown in FIG. 15 is brought to an end.

In the ATM concentrator according to the fourth embodiment, the maximum number of times that the readout controller 25 searches for j is g per loop, and hence the number of processing steps is smaller than the maximum number n of times that the readout controller searches for j when cells are multiplexed for the highways. Furthermore, the maximum number of times that the readout controller 25 searches for k is also g per loop, and hence the number of processing steps is smaller than the maximum number n of times that the readout controller searches for k when cells are multiplexed for the highways. However, even when a certain highway of an output buffer contains an idle cell, if the group to which the highway belongs is a valid group, then the highway will not be overwritten by a valid cell. Therefore, the network utilization factor is lower than when cells are multiplexed for the highways. Consequently, the ATM concentrator according to the fourth embodiment is effective in reducing the number of processing steps for transferring cells at a high speed.

The ATM concentrator shown in FIG. 13 has the valid group cell positional information tables 23-1 to 23-CL to obtain valid group positional information L1 to LCL of the respective quality classes. However, the ATM concentrator may not have the valid group cell positional information tables 23-1 to 23-CL. If the valid group cell positional information tables 23-1 to 23-CL are dispensed with, then when ATM cells are read from the output cell buffers, the readout controller 25 and the quality class multiplexer 24 refer to the headers of the read ATM cells to decide whether the ATM cells are valid cells or not, and obtain valid group positional information L1 to LCL based on the determined result.

The ATM concentrator shown in FIG. 13 has the valid group number tables 22-1 to 22-CL to obtain valid group numbers N1 to NCL of the respective quality classes. However, the ATM concentrator may not have the valid group number tables 22-1 to 22-CL. If the valid group number tables 22-1 to 22-CL are dispensed with, then when ATM cells are read from the output cell buffers, the readout controller 25 and the quality class multiplexer 24 refer to the headers of the read ATM cells to decide whether the ATM cells are valid cells or not, and obtain valid group numbers N1 to NCL.

In the ATM concentrator shown in FIG. 13, the cell positional information is not limited to any particular form. According to an alternative, for example, a bit string having as many bits as the total number g of the groups are prepared, and the bits are assigned sequentially to the group numbers. If cells stored in the output cell buffers of a group are valid cells, then "1" is entered into the bit corresponding to the group number, and if cells stored in the output cell buffers of a group are invalid cells, then "0" is entered into the bit corresponding to the group number. Alternatively, the group numbers of groups where valid cells are stored may be stored in a memory.

Each of the ATM concentrators shown in FIGS. 5, 8, 10, and 13 has sorting units for the respective quality classes for concentrating input cells with respect to the quality classes. However, sorting units are not limited to the illustrated sorting units.

The sorting unit shown in FIG. 4 has the routing decision circuit 13 and the routing network 14 to prevent valid cells from being outputted only to certain ones of the n output highways for thereby uniformly distributing the valid cells to the n output highways. However, it is possible to dispense with the routing decision circuit 13 and the routing network 14, and yet to perform the full priority control even when the numbers of valid cells in the respective output highways are different.

Figure 16:
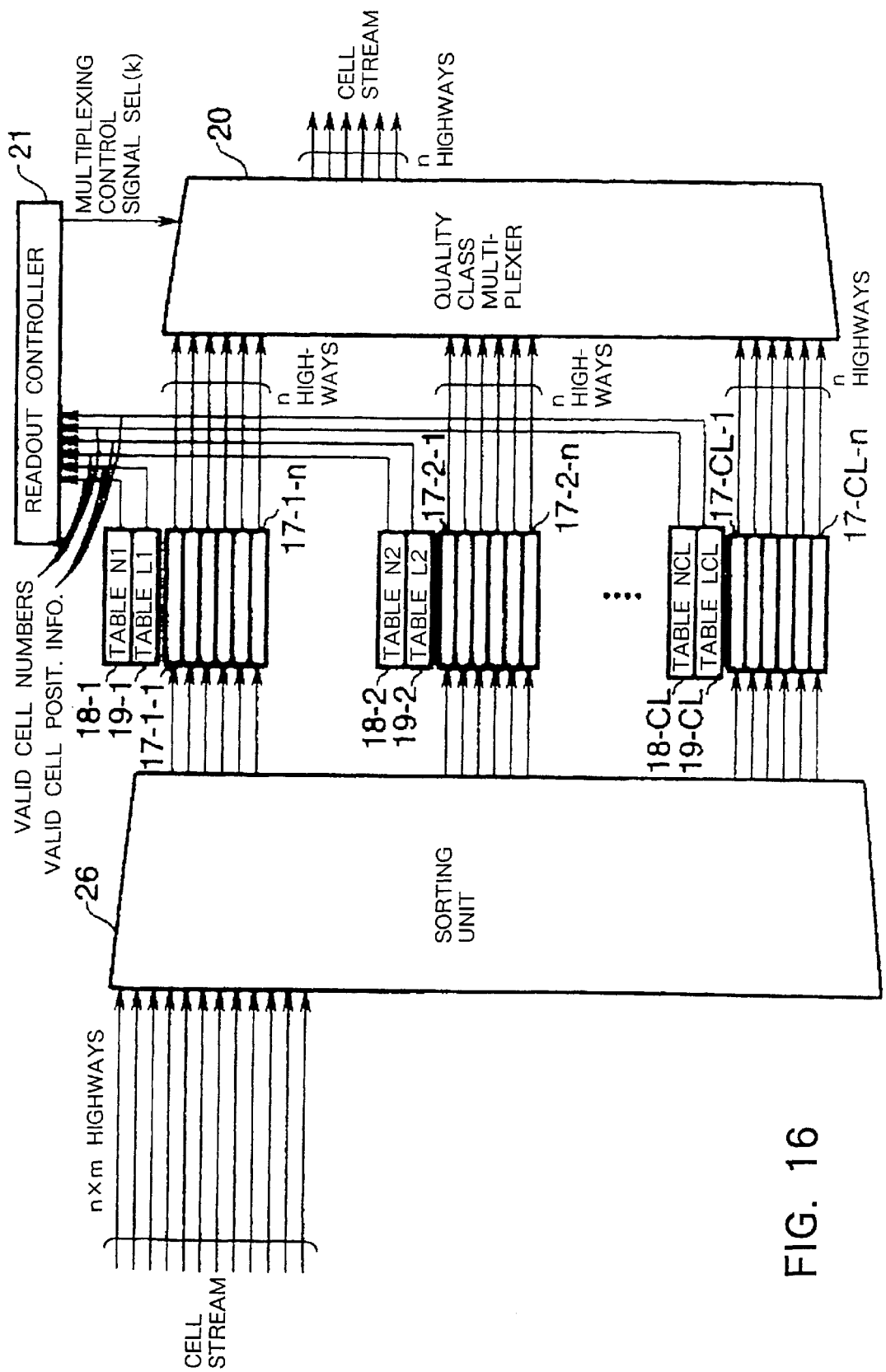
FIG. 16 is a block diagram of an ATM concentrator according to a fifth embodiment of the present invention.
Figure 17:
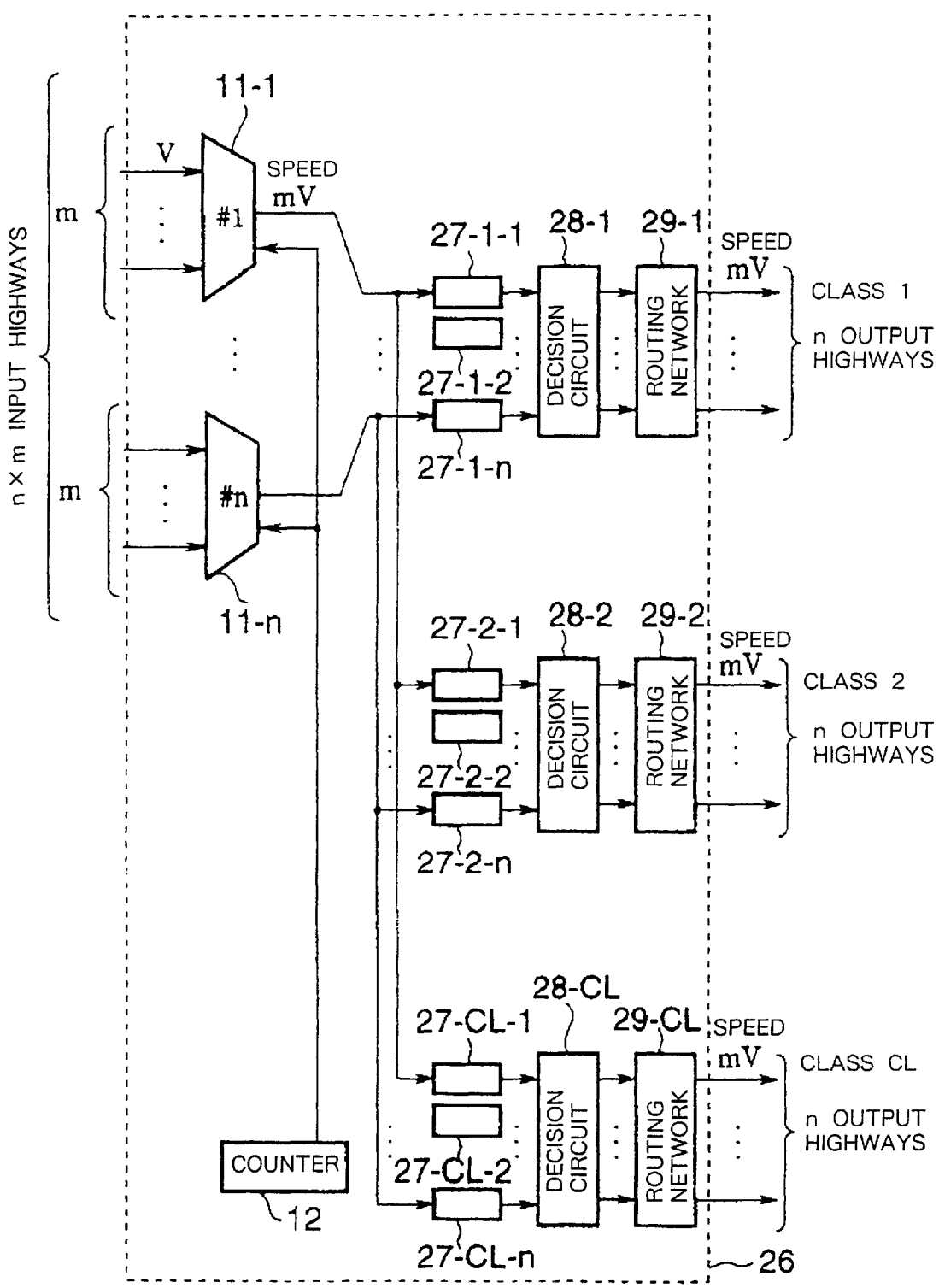
FIG. 17 is a block diagram of a sorting unit in the ATM concentrator shown in FIG. 16.

FIG. 16 shows in block form an (m×n–n) ATM concentrator according to a fifth embodiment of the present invention, for performing the full priority control with respect to quality classes 1 to CL. As shown in FIG. 16, the ATM concentrator has a single sorting unit 26 for sorting cells of a plurality of quality classes, that is, classes 1 to CL. The sorting unit 26 is equivalent to a combination of the sorting units 16-1 to 16-CL for the respective quality classes 1 to CL in the ATM concentrator shown in FIG. 10. FIG. 17 shows the sorting unit 26 in detail.

As shown in FIG. 17, the sorting unit 26 has n (m−1) selectors 11-1 to 11-n, a counter 12 for controlling multiplexing of cells in the n pieces of (m−1) selectors 11-1 to 11-n, (CL×n) pieces of connection quality class filters 27-1-1 to 27-CL-n, CL pieces of routing decision circuits 28-1 to 28-CL for the respective quality classes, and routine networks 29-1 to 29-CL connected to output terminals of the routing decision circuits 28-1 to 28-CL, respectively. Each of the (m−1) selectors 11-1 to 11-n serves to multiplex cells from m input highways at a speed that is m times the speed of input signals. A total of n multiplexed signals from the (m−1) selectors 11-1 to 11-n are transmitted to the connection quality class filters 27-1-1 to 27-CL-n. Specifically, a multiplexed signal from the first (m−1) selector 11-1 is applied parallel to the CL connection quality class filters 27-1-1, 27-2-1, . . . , 27-CL-1.

Each of the connection quality class filters 27-1-1 to 27-CL-n refers to the VPI, the VCI, and the CLP bit in the header of an inputted ATM cell to decide whether the ATM cell is an valid cell of a passing connection to pass therethrough or not and also whether the ATM cell is a valid cell of a quality class to pass therethrough or not. If the ATM cell is a cell to pass therethrough, then the cell is outputted uniformly to the n output highways by the routing decision circuits 28-1 to 28-CL and the routing networks 29-1 to 29-CL for the respective classes 1 to CL. The speed of the outputted signal is m times the speed of the inputted signal.

The sorting unit shown in FIG. 17 is capable of performing the full priority control without the routing decision circuits and the routing networks.

Figure 18:
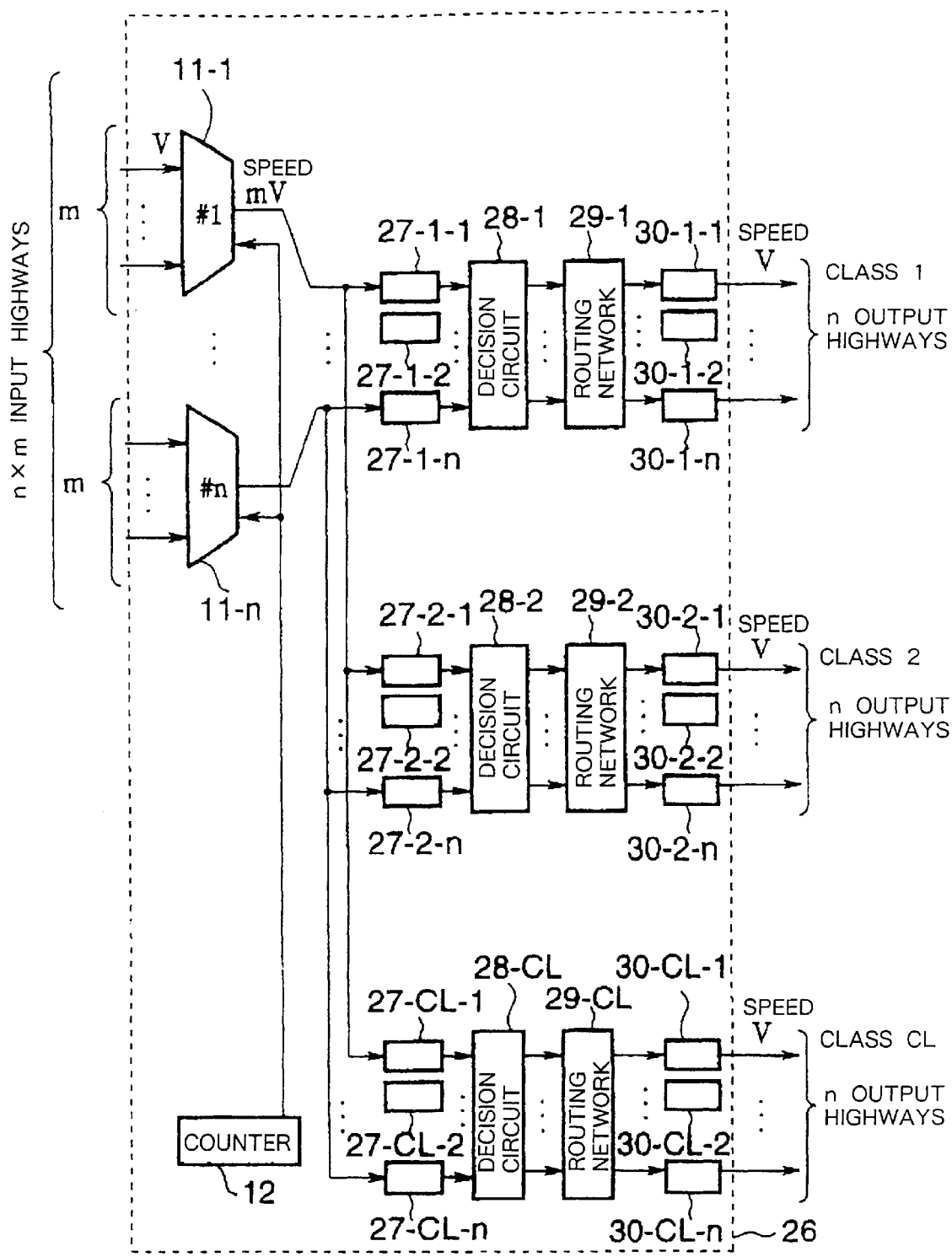
FIG. 18 is a block diagram of a modification of the sorting unit in the ATM concentrator shown in FIG. 16.

FIG. 18 shows in block form a modification of the sorting unit 26 in the ATM concentrator shown in FIG. 16. The sorting unit shown in FIG. 18 differs from the sorting unit shown in FIG. 17 in that it additionally includes cell buffers 30-1-1 to 30-CL-n inserted to the respective output highways, for outputting cells of the respective quality classes 1 to CL.

In the sorting unit 26 shown in FIG. 18, the cell buffers 30-1-1 to 30-CL-n output cells in each cell slot at the same speed as the speed at which input signals are transmitted to the sorting unit 26. If the cell buffers 30-1-1 to 30-CL-n have a sufficient large cell buffer length and traffics of the quality classes are uniform, then the cell buffers 30-1-1 to 30-CL-n do not suffer a buffer overflow. The speed of signals in the output highways of the sorting unit 26 shown in FIG. 18 is 1/m of the speed of signals in the output highways of the sorting unit 26 shown in FIG. 17. The sorting unit 26 shown in FIG. 18 is applicable to cases where high-speed signal transfer is not viable, such as transmission between packages.

The sorting unit shown in FIG. 18 is capable of performing the full priority control without the routing decision circuits and the routing networks.

The difference between the throughputs of the ATM concentrator according to the present invention and the conventional ATM concentrator will be described below. It is assumed that the number of quality classes is 2, the number of output highways is n, the number of valid cells at the cell output positions of the output buffers for the high quality class is N1, and the number of valid cells at the cell output positions of the output buffers for the low quality class is N2. With the conventional ATM concentrator, the utilization factor of the n output highways is represented by N1×100/n (%). According to the present invention, if N1+N2<n, then since N1 cells of the high priority class and N2 cells of the low priority class are multiplexed by the quality class multiplexer and transmitted to the output highways, the utilization factor of the n output highways is represented by (N1+N2)×100/n (%). As a result, the throughput of the ATM concentrator according to the present invention is increased when a traffic arrival interval is such that the sum of the valid cell numbers N1, N2 is equal to or smaller than n. For the same reasons, the throughput of the ATM concentrator according to the present invention is increased when three or more quality classes are established for the full priority control.

With the conventional ATM concentrator, because valid cells of the low priority class are outputted only after all valid cells of the high priority class are outputted, the average delay time of the valid cells of the low priority class tends to be long. With the ATM concentrator according to the present invention, if the sum of the number N1 of the valid cells at the cell output positions of the output buffers for the high priority class and the number N2 of the valid cells at the cell output positions of the output buffers for the low priority class is equal to or smaller than n, then valid cells of the low priority class can be transferred in the same cell slot as the valid cells of the high priority class. Therefore, the average delay time of the valid cells of the low priority class is shortened. For the same reasons, when three or more quality classes are established for the full priority control, the average delay time of the valid cells of the low priority class is also shortened.

While preferred embodiments of the present invention have been described using specific terms, such description is for illustrative purposes only, and it is to be understood that changes and variations may be made without departing from the spirit or scope of the following claims.

What is claimed is:

1. An ATM concentrator having (m×n) input highways and n output highways and established CL quality classes ranging from a quality class 1 of highest priority to a quality class CL of lowest priority, for performing a priority control for outputting cells of a quality class of relatively high priority in preference to cells of a quality class of relatively low priority, where each of m, n, CL is an integer of 2 or greater, comprising:

output cell buffers for the respective quality classes, associated respectively with said output highways;

a readout controller for checking a number of valid cells of cells read from said n output highways for each of said quality classes, determining a quality class c with respect to which an accumulated value of the numbers of valid cells calculated successively from quality classes of higher priority is maximum within a total number n of said output highways, generating a multiplexing control signal to instruct the output cell buffers of the quality class 1 to output n cells if the determined quality class c is the quality class 1, and checking highways corresponding to valid cells of cells read from the output cell buffers of the quality classes 2 through c and generating a multiplexing control signal to instruct writing of valid cells of the quality classes 2 through c over highways corresponding to cells which are not valid cells, of cells read from the output cell buffers of the quality class 1, if the determined quality class c is a quality class other than the quality class 1; and a quality class multiplexer for outputting n cells read from the output cell buffers of the quality class 1 according to said multiplexing control signal or outputting a total of n cells produced by multiplexing the valid cells read from the output cell buffers of the quality classes 2 through c with n cells read from the output cell buffers of the quality class 1 based on said multiplexing control signal, to said n output highways;

whereby priority control of the quality class of relatively high priority and the quality class of relatively low priority can be carried out based on the multiplexing control signal generated by said readout controller.

2. An ATM concentrator according to claim 1, further comprising:

valid cell number tables associated with the respective quality classes, for holding numbers of counted valid cells at cell output positions of the output cell buffers;

said readout controller comprising means for determining a maximum number of quality classes to be multiplexed based on information of the numbers of counted valid cells read from said valid cell number tables.

3. An ATM concentrator according to claim 1, further comprising:

valid cell positional information tables associated with the respective quality classes, for holding valid cell positional information indicative of which highways valid cells are stored in at cell output positions of the output cell buffers of the quality classes;

said readout controller comprising means for determining which highways valid cells of the quality classes 2 through c are to be overwritten in, based on the valid cell positional information read from said valid cell positional information tables.

4. An ATM concentrator according to claim 1, further comprising:

sorting units, provided for respective quality classes, for connecting said (m×n) input highways to said n output highways, selecting only valid cells of the quality classes and supplying the selected valid cells to said output cell buffer for the respective quality classes.

5. An ATM concentrator having (m×n) input highways and n output highways and established CL quality classes ranging from a quality class 1 of highest priority to a quality class CL of lowest priority, for performing a priority control for outputting cells of a quality class of relatively high priority in preference to cells of a quality class of relatively low priority, where each of m, n, CL is an integer of 2 or greater, comprising:

output cell buffers for the respective quality classes, associated respectively with said output highways, said n output highways including a plurality of adjacent highways put together into g highway groups each composed of an equal number of highways, where g is a positive integer of n or less;

a readout controller for checking a number of groups containing valid cells read from said n output highways for each of said quality classes, determining a quality class c with respect to which an accumulated value of the numbers of groups containing valid cells calculated successively from quality classes of higher priority is maximum within a total number g of said groups, generating a multiplexing control signal to instruct the output cell buffers of the quality class 1 to output g groups read therefrom if the determined quality class c is the quality class 1, and checking groups containing valid cells, of groups from the output cell buffers of the quality classes greater than 1 and generating a multiplexing control signal to instruct writing of valid cells from the output cell buffers of the quality classes greater than 1 over groups which do not contain valid cells, of groups from the output cell buffers of the quality class 1, if the determined quality class c is a quality class other than the quality class 1; and a quality class multiplexer for outputting valid cells of the g groups from the output cell buffers of the quality class 1 according to said multiplexing control signal or outputting valid cells of a total of g groups produced by multiplexing groups containing the valid cells read from the output cell buffers of the quality classes greater than 1 with g groups from the output cell buffers of the quality class 1 based on said multiplexing control signal, to said n output highways;

whereby priority control of the quality class of relatively high priority and the quality class of relatively low priority can be carried out based on the multiplexing control signal generated by said readout controller.

6. An ATM concentrator according to claim 5, further comprising:

valid group number tables associated with the respective quality classes, for holding total numbers of counted groups containing valid cells at cell output positions of the output cell buffers;

said readout controller comprising means for determining a maximum number of quality classes to be multiplexed based on information of the total numbers of counted groups read from said valid group number tables.

7. An ATM concentrator according to claim 5, further comprising:

valid group positional information tables associated with the respective quality classes, for holding valid group positional information indicative of which groups valid cells are stored in at cell output positions of the output cell buffers of the quality classes;

said readout controller comprising means for determining which output groups valid cells of the quality classes 2 through c are to be overwritten in, based on the valid group positional information read from said valid group positional information tables.

8. An ATM concentrator according to claim 5, further comprising:

sorting units, provided for respective quality classes, for connecting said (m×n) input highways to said n output highways, selecting only valid cells of the quality classes and supplying the selected valid cells to said output cell buffers for the respective quality classes.

* * * * *